US008429820B2

(12) United States Patent
Koyama et al.

(10) Patent No.: US 8,429,820 B2
(45) Date of Patent: Apr. 30, 2013

(54) METHOD OF MANUFACTURING LIQUID DISCHARGE HEAD

(75) Inventors: Shuji Koyama, Kawasaki (JP); Sakai Yokoyama, Kawasaki (JP); Kenji Fujii, Yokohama (JP); Jun Yamamuro, Yokohama (JP); Keiji Matsumoto, Yokohama (JP); Tetsuro Honda, Kawasaki (JP); Kouji Sasaki, Nagareyama (JP); Kenta Furusawa, Yokohama (JP); Keisuke Kishimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 13/219,502

(22) Filed: Aug. 26, 2011

(65) Prior Publication Data

US 2012/0047738 A1 Mar. 1, 2012

(30) Foreign Application Priority Data

Sep. 1, 2010 (JP) ................................ 2010-195708
Dec. 21, 2010 (JP) ................................ 2010-285146
Dec. 28, 2010 (JP) ................................ 2010-293023

(51) Int. Cl.
*B21D 53/76* (2006.01)
*B23P 17/00* (2006.01)

(52) U.S. Cl.
USPC ........................................................ 29/890.1

(58) Field of Classification Search ................. 29/890.1; 347/20, 40; 264/614, 619
See application file for complete search history.

(56) References Cited

U.S. PATENT DOCUMENTS 4,882,595 A * 11/1989 Trueba et al. ................... 347/85
4,894,664 A * 1/1990 Tsung Pan ....................... 347/63
5,952,397 A * 9/1999 Fujiki et al. ...................... 522/99
5,980,017 A * 11/1999 Sato ................................ 347/20
6,000,787 A * 12/1999 Weber et al. ..................... 347/65
6,019,457 A * 2/2000 Silverbrook ..................... 347/65
6,045,214 A * 4/2000 Murthy et al. ................... 347/47
6,120,135 A * 9/2000 Murthy et al. ................... 347/58
6,284,436 B1 * 9/2001 Ahn et al. ...................... 430/320
6,595,627 B2 * 7/2003 Min et al. ........................ 347/65
6,652,077 B2 * 11/2003 Maeng et al. ................... 347/56
6,682,874 B2 * 1/2004 Ramaswami et al. ........ 430/320
6,837,572 B2 * 1/2005 Ramaswami et al. .......... 347/47
7,465,403 B2 * 12/2008 Kim et al. ....................... 216/27
7,487,590 B2 * 2/2009 Song et al. ................... 29/890.1
7,506,443 B2 * 3/2009 Bowling et al. .............. 29/890.1
7,533,463 B2 * 5/2009 Conta et al. .................. 29/890.1
7,814,657 B2 * 10/2010 Yokouchi ..................... 29/890.1
7,950,150 B2 * 5/2011 Yoo et al. ..................... 29/890.1
2002/0008738 A1 * 1/2002 Lee et al. ........................ 347/62
2002/0167553 A1 * 11/2002 Nikkel .............................. 347/1

* cited by examiner

FOREIGN PATENT DOCUMENTS

JP 2005-205916 A 8/2005

*Primary Examiner* — David Angwin
(74) *Attorney, Agent, or Firm* — Canon USA Inc IP Division

(57) ABSTRACT

The present invention is a method of manufacturing a liquid discharge head, which includes providing a substrate on which a solid member is disposed to surround a region that becomes the flow path, and a metal layer made of a metal or a metal compound is disposed inside of the region, forming a mold made of a metal or a metal compound inside of the region, disposing a cover layer made of a resin to cover the solid member and the mold in contact with the solid member and the mold wherein the solid member and the metal are formed with a distance therebetween, and removing the mold to form the flow path.

13 Claims, 24 Drawing Sheets

METHOD OF MANUFACTURING LIQUID DISCHARGE HEAD

BACKGROUND OF THE INVENTION

1. Field of the Invention

The present invention relates to a method of manufacturing a liquid discharge head.

2. Description of the Related Art

As a representative example of a liquid discharge head for discharging a liquid, there is an ink-jet recording head for an ink-jet recording unit that discharges an ink to a recording medium to record an image. The ink-jet recording head generally includes ink flow paths, discharge energy generating elements disposed in a part of the flow paths, and fine ink discharge ports for discharging an ink by energy generated there.

A method of manufacturing a liquid discharge head applicable to an ink-jet recording head is discussed in Japanese Patent Application Laid-Open No. 2005-205916. According to the method, after flow path walls of liquid were formed on a substrate equipped with energy generating elements, a resinous embedding member is coated between the flow path walls and on the flow path walls, and the embedding member is flattened by chemomechanical polishing (CMP). After that, on the flow path walls and embedding member, a resin for forming an orifice plate equipped with discharge ports is coated to form a resin layer, and discharge ports are provided in the resin layer.

SUMMARY OF THE INVENTION

A method of manufacturing a liquid discharge head having flow paths of liquid, which communicate with discharge ports of the liquid includes: providing a substrate on which a solid member is disposed to surround a region that becomes the flow paths; forming a mold of the flow paths made of a metal or a metal compound in the region; providing a cover layer made of a resin to cover the solid member and the mold in contact with the solid member and the mold; and removing the mold to form the flow paths.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1A:
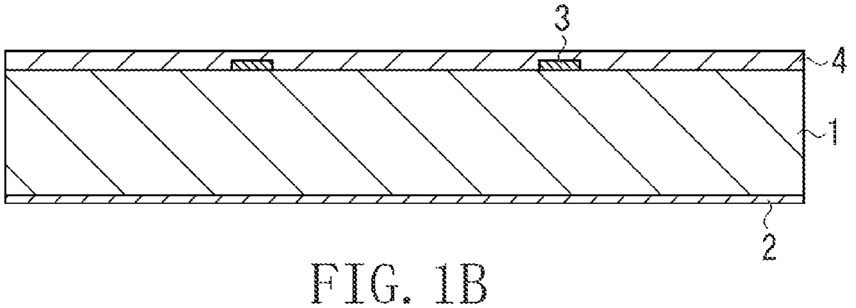
FIGS. 1A, 1B, 1C, 1D, 1E, 1F, and 1G are schematic sectional views for describing a method of manufacturing an ink-jet head according to a first exemplary embodiment of the present invention.

Various exemplary embodiments, features, and aspects of the invention will be described in detail below with reference to the drawings.

According to a deliberation result of the present inventors, since in a method described in Japanese Patent Application Laid-Open No. 2005-205916, an embedding material is made of a resin, and thereon a resin is coated to form an orifice plate member, in some cases, both of the embedding member and the orifice plate member are dissolved to mix with each other to result in a mixture of both members. Even when the embedding member is removed, the mixture remains inside of the flow path wall surface, adversely affects a finished shape of the flow path, and, in some cases, adversely affects the discharge characteristics such as refill characteristics of a liquid.

The present invention was performed in view of the conventional technology, and is directed to provide, as one of objects, a method of manufacturing a liquid discharge head, by which a liquid discharge head having very precisely formed flow paths can be obtained, which results in high yield.

In the following, the present invention will be described with reference to the drawings. In the description below, to a structure having the same function, the same No. is imparted in the drawing, and the description thereof may be omitted.

Furthermore, the liquid discharge head can be mounted on apparatuses such as printers, copiers, facsimiles having a communication system, and word processors having a printer portion, and further industrial recording apparatuses compositely combined with various types of processing devices. For example, the head can be used also to manufacture biochips, print electric circuits, and discharge chemicals in spraying manner. In the following description, with an ink-jet head as an example of the liquid discharge head, a method of manufacturing the same will be described, and thereby an exemplary embodiment of the present invention will be described.

Figure 2:
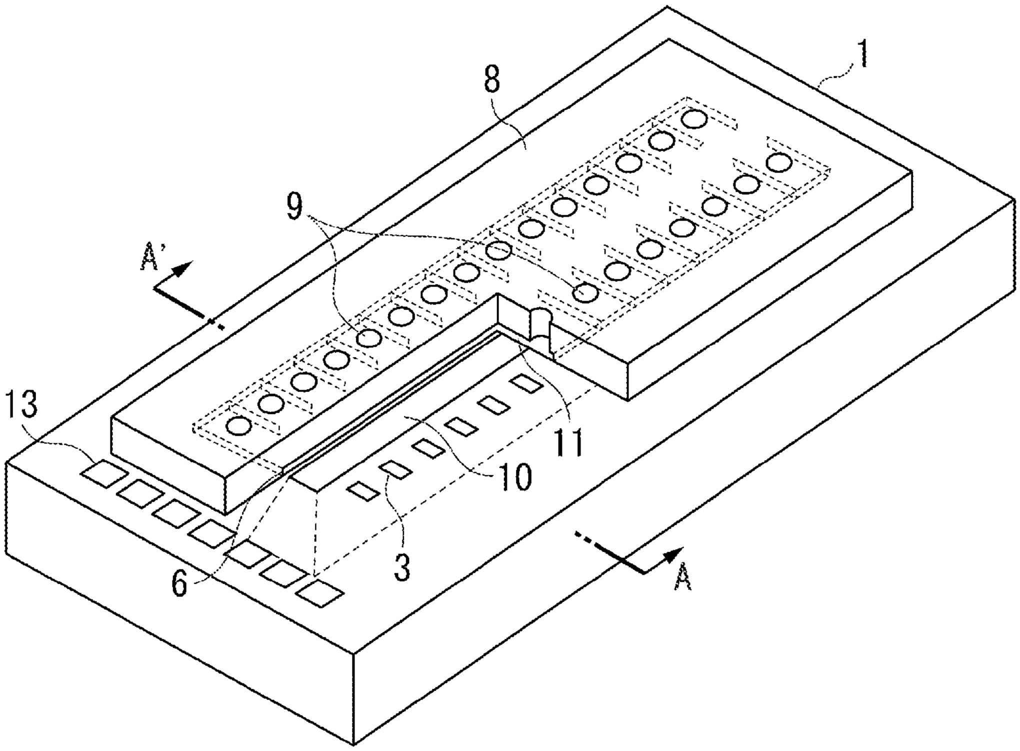
FIG. 2 is a schematic perspective view illustrating one example of an ink-jet head manufactured according to an exemplary embodiment of the present invention.

FIG. 2 is a partially watermarked schematic perspective view illustrating one example of a liquid discharge head manufactured according to a method of manufacturing an ink-jet head of an exemplary embodiment of the present invention. As illustrated in FIG. 2, the liquid discharge head includes a silicon substrate 1 on which energy generating elements 3 for generating energy to be used for discharging ink are arranged in two rows at the predetermined pitch. On the substrate 1, ink discharge ports 9 opened in the upper side of an ink flow path 11 and energy generating elements 3 are formed in a discharge port plate portion 8 of a flow path wall member 6 having an internal wall of the ink flow path. Further, the discharge port plate portion 8 forms a portion opposite to a substrate of an inside wall of the ink flow path 11 communicating from an ink supply port 10 to the respective ink discharge ports 9. The ink supply port 10 formed by anisotropic etching of silicon is opened between the two rows of the energy generating elements 3. The ink-jet head applies pressure generated by the energy generating elements 3 to an ink filled in the ink flow path 11 via the ink supply port 10, and, thereby liquid droplets are discharged from the ink discharge ports 9 to stick on the recording medium to record an image.

With reference to FIGS. 1A to 1G, a method of manufacturing an ink-jet head according to a first exemplary embodiment of the present invention will be described.

FIGS. 1A to 1G are schematic sectional views representing a cut surface in the respective processes cut through A-A' of FIG. 2 and is vertical to the substrate 1.

On the substrate 1 illustrated in FIG. 1A, a plurality of energy generating elements 3 such as heating resistors is disposed. On the energy generating elements 3, an insulating film 4 is formed. On a back surface of the substrate 1, an oxide film 2 that works as a mask when an ink supply port is formed is provided. An electrode pad (not illustrated in the drawing) that performs electrical connection is formed by deposition or by plating. A wiring of the heater 3 and a semiconductor device for driving the heaters are not illustrated in the drawing.

Figure 1B:
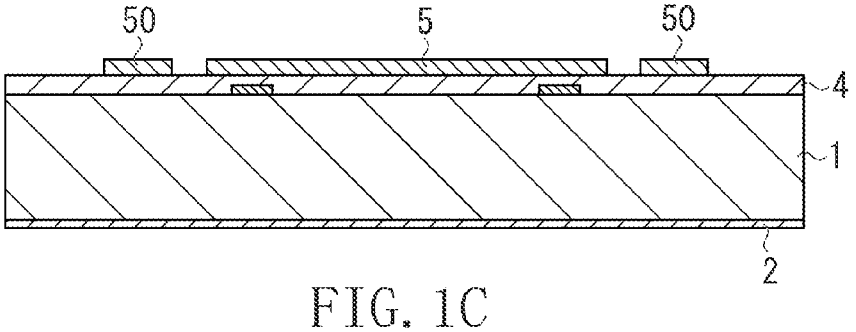

First, as illustrated in FIG. 1B, a seed layer 5 that is a metal layer made of a metal, a metal alloy, or a metal compound and used for forming a mold on the substrate 1 by an electroless plating method, and an external metal layer 50 used as an adhesion layer of the flow path wall are formed by patterning in block. More specifically, a photolithography process is used to perform patterning on the seed layer 5, the external metal layer 50, and a metal layer made of metal or a compound thereof. The seed layer 5 and the external metal layer 50 are disposed distanced from each other. At this time, if the adhesiveness between a flow path wall that is formed in the following process and a substrate surface is enough, the external metal layer 50 in the lower side of the flow path wall does not need to be formed.

Figure 1C:
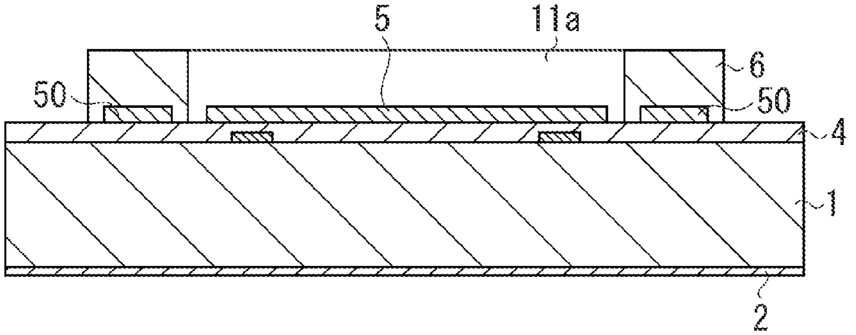
Figure 3:
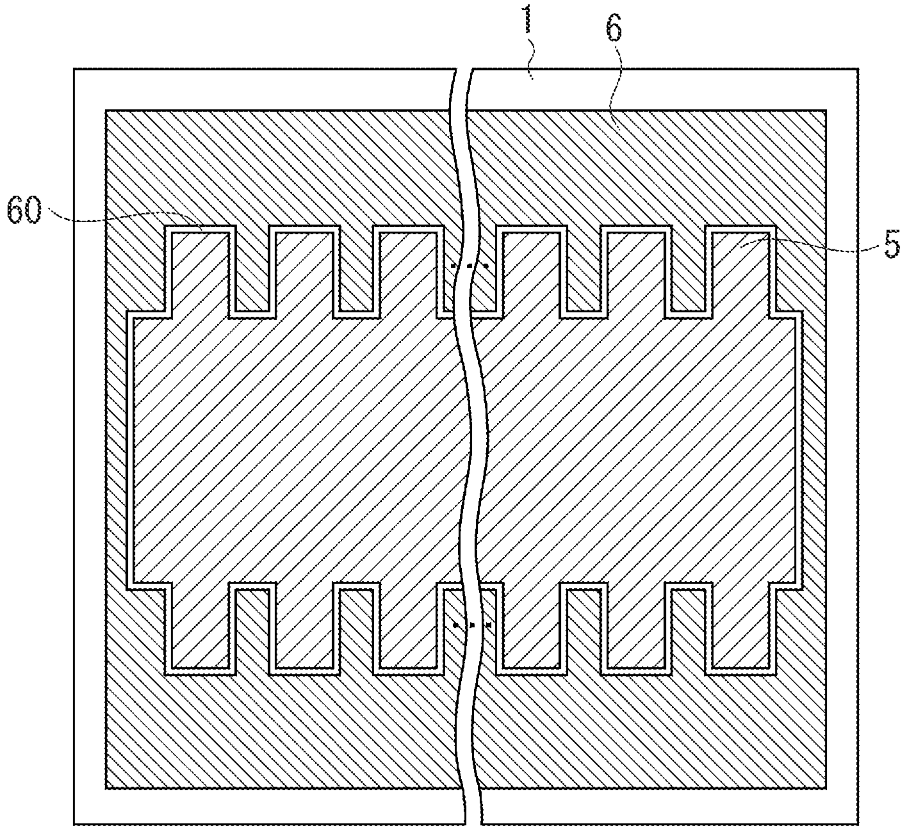
FIG. 3 is a schematic diagram for describing a state of a substrate in the manufacturing process in a method of manufacturing an ink-jet head according to the first exemplary embodiment of the present invention.

Next, as illustrated in FIG. 1C, a photosensitive resin that becomes a flow path wall is coated by spin coating, and exposed with UV-rays or Deep UV-rays, and developed, thereby a solid member 6 that becomes a flow path sidewall is formed. The solid member 6 is formed to surround a region 11*a* that becomes a flow path. In FIG. 3, a state of a top surface after the seed layer 5 of a portion forming a mold, and the solid member 6 are formed is illustrated. Thus, inside the solid member 6 and within a region that becomes the flow path, the seed layer 5 having a shape of the flow path is formed. Taking into consideration isotropic growth of plating, there may be a certain separation between the solid member 6 and the seed layer 5 (60 of FIG. 3). The solid member 6 can be disposed to entirely cover the external metal layer 50 to come into contact with a side surface from a top surface of the external metal layer 50.

Figure 1D:
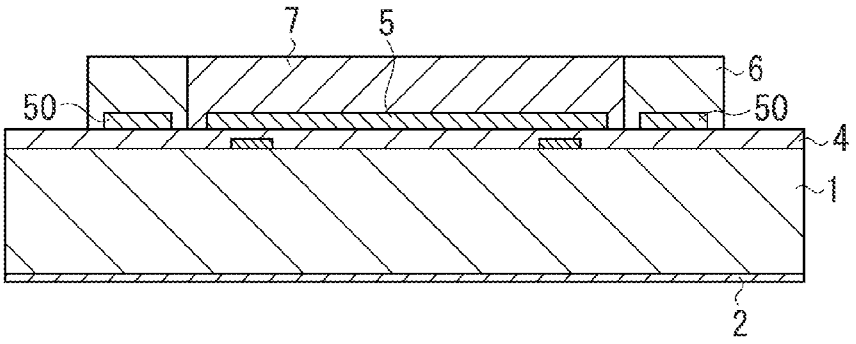

Next, as illustrated in FIG. 1D, by use of the seed layer 5 and according to the electroless plating, a mold 7 of the flow path is formed by a plating layer obtained by growing metal or alloy containing the metal. As a forming method thereof, a generally known electroless plating method is used. When the electroless plating method is used, the mold 7 is selectively formed only on the seed layer 5. The solid member 6 works as a plating resist. By controlling a time period of the plating, the mold can be disposed at a desired thickness. When a thickness of the plating layer has a height similar to a height from a surface of the substrate 1 of the solid member 6 or is slightly thinner than that, a covering photosensitive resin can be readily coated After that. Since the plating layer is formed flat, there is no need of particular flattening treatment on a top surface of the mold 7. However, when the mold 7 is formed at a thickness larger than the solid member 6, the top surface of the mold 7 can be polished.

Figure 1E:
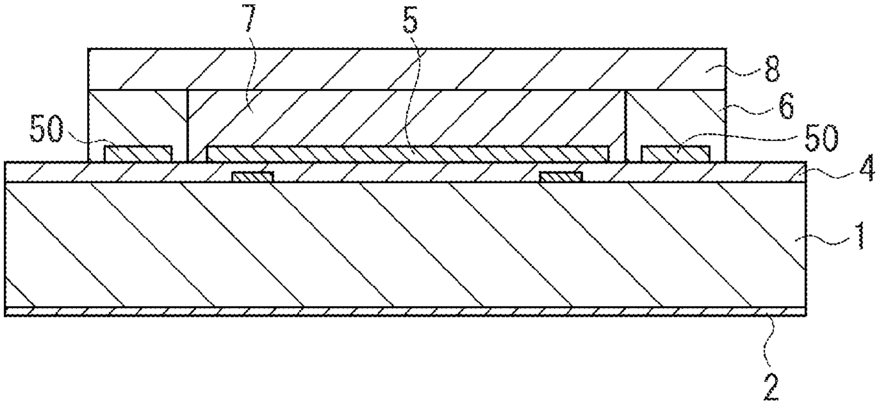

Next, as illustrated in FIG. 1E, a covering photosensitive resin 8 that is a same kind of material as the solid member 6 is coated by spin coating. While as a solvent of the covering photosensitive resin 8, a mix solvent of xylene or MIBK and diglyme is used, an inorganic material is formed in the mold according to the electroless plating; accordingly, there is substantially no compatibility between the mold 7 and the covering photosensitive resin 8. A water repellent may be coated in the upper side of the covering photosensitive resin 8.

Figure 1F:
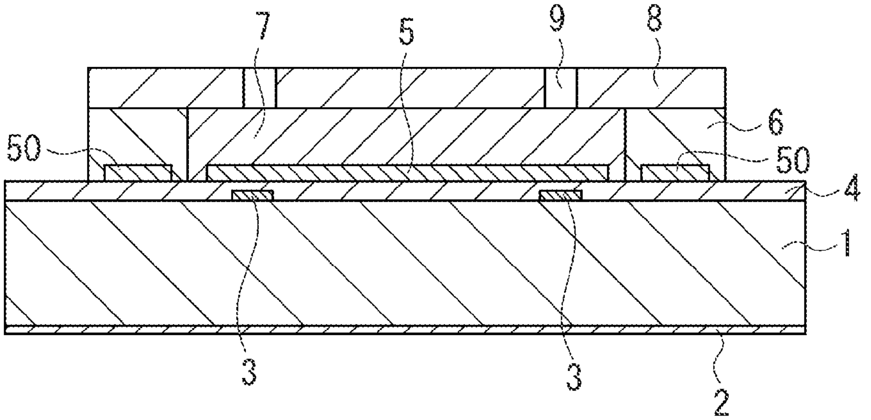

Then, as illustrated in FIG. 1F, the ink discharge port 9 is formed at a position that faces the energy generating element 3 of the covering photosensitive resin 8. When the discharge port is formed, an exposure unit such as a stepper is used to perform exposure. The covering photosensitive resin 8 is a negative resin; accordingly, exposure is performed so that light does not impinge on the discharge port. After that, development is performed to form the ink discharge port 9 corresponding to each of the energy generating elements 3.

Figure 1G:
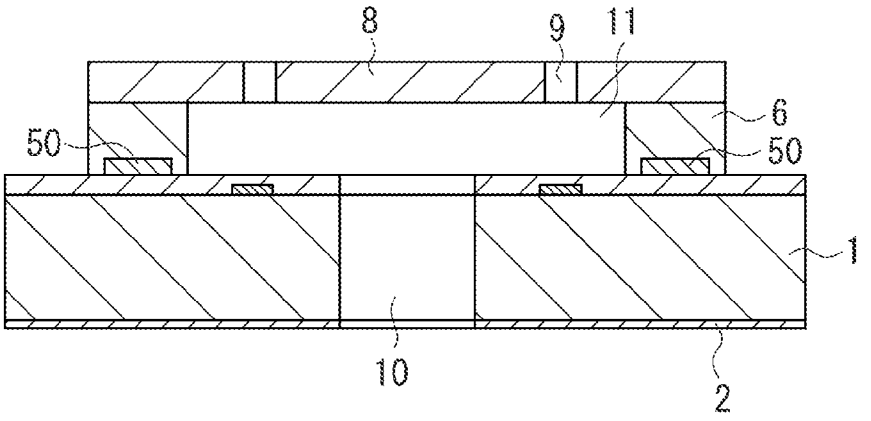

Next, as illustrated in FIG. 1G, the oxide film 2 of a portion that becomes an ink supply port is patterned by a photolithography method to form the ink supply port 10. Then, the seed layer 5 and the mold 7 formed in the ink flow path are removed using a removing liquid to form the flow path 11. The mold 7 made of metal which fills a region that becomes the flow path, and the covering photosensitive resin 8 that becomes a discharge port member are inhibited from mixing with each other. Thereby, when the mold 7 is removed, the mold 7 inside of the flow path 11 does not partially remain, so that the flow path 11 having a shape same as the mold 7 of the flow path is formed. Further, a boundary between the mold 7 and the covering photosensitive resin 8 is distinct; accordingly, even when a concentration of the removing liquid of the mold 7 slightly fluctuates, without receiving influence thereof, the flow path can be formed with excellent reproducibility. The substrate 1 on which a nozzle portion is formed according to the process mentioned above is cut by a dicing saw and separated into chips, then electrically connected to drive the energy generating elements 3. Then, a chip tank member for ink supply is connected and an ink-jet head is completed.

With reference to FIGS. 4A to 4F, a second exemplary embodiment of the present invention will be described. FIGS. 4A to 4F are sectional views seen at a position the same as FIGS. 1A to 1G.

Figure 4A:
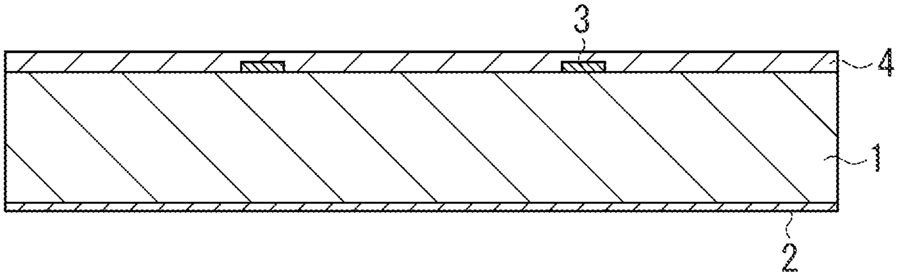
FIGS. 4A, 4B, 4C, 4D, 4E, and 4F are schematic sectional views for describing a method of manufacturing an ink-jet head according to a second exemplary embodiment of the present invention.

As illustrated in FIG. 4A, the substrate 1 is prepared in a manner the same as the first exemplary embodiment.

Figure 4B:
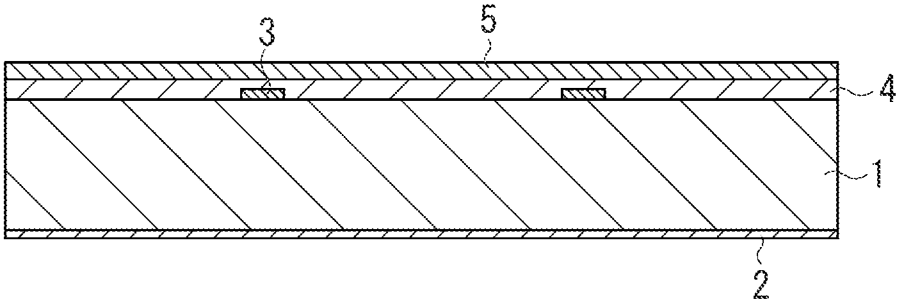

Then, as illustrated in FIG. 4B, the seed layer 5 is formed on the substrate 1. The seed layer 5, without patterning, may be wholly formed over the substrate 1.

Figure 4C:
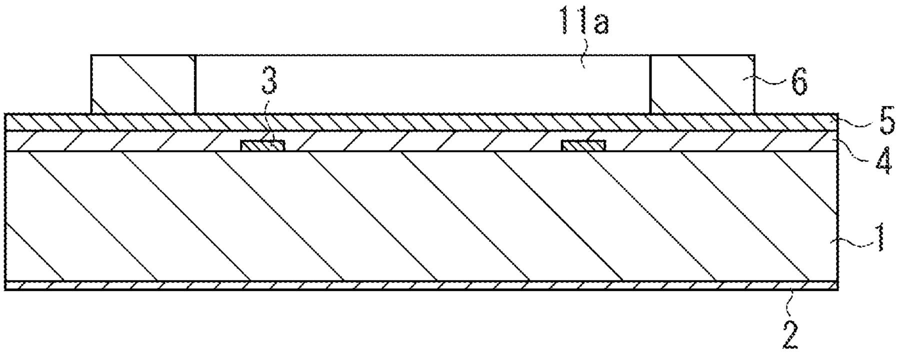
Figure 5:
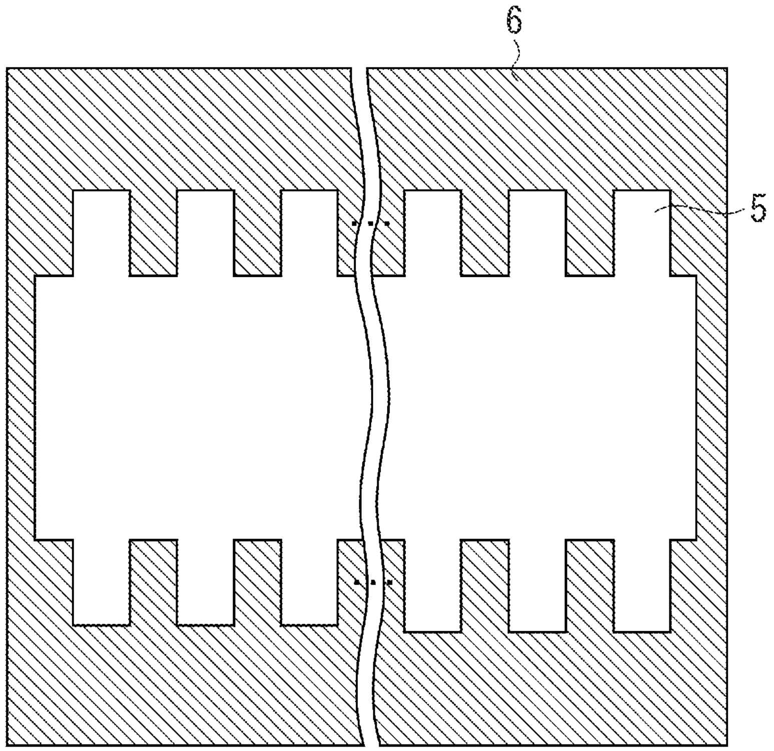
FIG. 5 is a schematic view for describing a state of a substrate in the manufacturing process in a method of manufacturing an ink-jet head according to the second exemplary embodiment of the present invention.

Next, as illustrated in FIG. 4C, a photosensitive resin that becomes a flow path sidewall is coated by spin coating, exposed with UV-rays or Deep UV-rays and developed, thereby the solid member 6 that becomes a flow path sidewall is formed. In FIG. 5, a state of a top surface after the solid member 6 is formed is illustrated. The seed layer 5 is disposed in a region 11*a* that becomes the flow path to be surrounded by the solid member 6.

Further, the seed layer 5 is disposed between the solid member 6 and the substrate 1 to come into contact with both of them and is also disposed outside of the solid member 6.

Figure 4D:
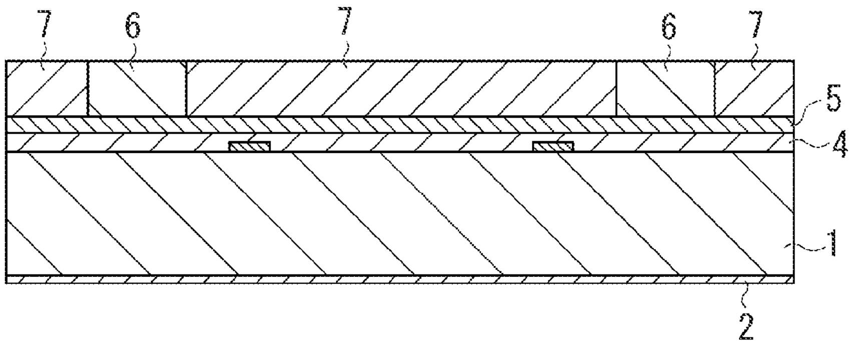

Next, as illustrated in FIG. 4D, by use of the seed layer 5, the mold 7 is formed according to an electroplating method. As a forming method, a generally known electroplating method is used. If the electroplating method is used, when energized, a plating layer is selectively formed only in a position on the seed layer and free from a resist pattern. A seed layer outside of the solid member 6 is electrically connected with a plating terminal at an edge portion of the substrate 1, so that a current is externally supplied to perform the electroplating. Since the mold 7 is formed by an electroplating method using external electric power, the mold 7 can be formed in a shorter period of time.

Figure 4E:
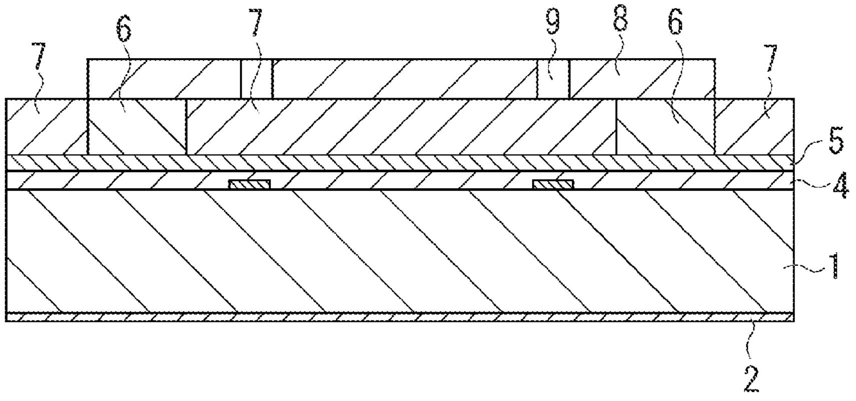

Next, as illustrated in FIG. 4E, the covering photosensitive resin 8 as a covering layer, which is a kind of material the same as the solid member 6 is coated by spin coating. As a solvent of the covering photosensitive resin 8, generally, a mix solvent of xylene or methyl isobutyl ketone (MIBK) and diglyme is used. Since a metal material is formed in the mold according to an electroplating method, there is substantially no compatibility between the mold 7 and the covering photosensitive resin 8. Inside and outside of the solid member 6, a plating layer having a height about the same as that of the solid member 6 is formed; accordingly, the covering photosensitive resin 8 is formed flat, and a distance between the discharge port 9 and the energy generating element 3 can be maintained constant within the substrate. A water repellent may be coated on the upper side of the covering photosensitive resin 8. After coating, to form the ink discharge port 9, an exposure unit such as a stepper is used to perform exposure. After that, development is performed and the ink discharge port 9 is formed.

Figure 4F:
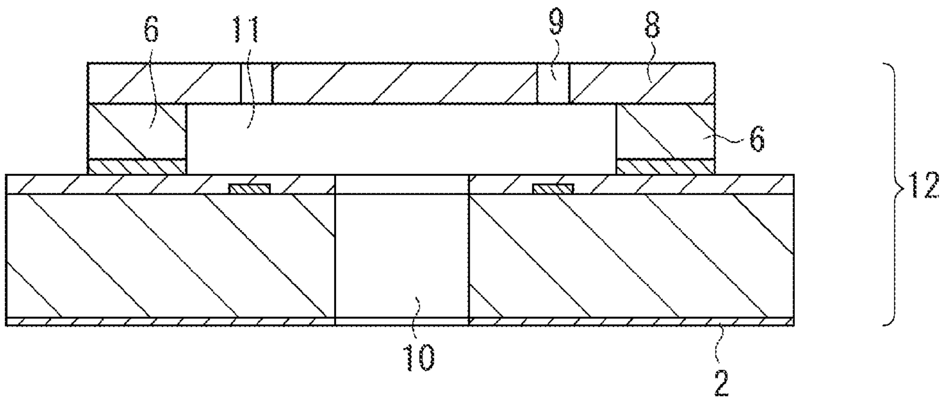

Next, as illustrated in FIG. 4F, after the oxide film 2 on aback side of the substrate is patterned by a photolithography method, the ink supply port 10 is formed. After that, the seed layer 5 and the mold 7 formed in the ink flow path and on the outer periphery of the chip are removed to form the flow path 11. At this time, also the seed layer 5 outside of the solid member 6 is removed together.

The substrate 1 on which a nozzle portion is formed according to the process mentioned above is cut by a dicing saw and separated into chips. Then, the substrate 1 is electrically connected to drive the energy generating elements 3. After that, a chip tank member for ink supply is connected and an ink-jet head is completed.

There is a difference of the thermal expansion coefficients between the flow path sidewall and the orifice plate member, and the substrate. Therefore, after a heating process, stress may be generated at a bonding portion with the substrate. This may affect the structural stability of the liquid discharge heads and deteriorate yield. The third and fourth exemplary embodiments are directed to solve the problem.

With reference to FIGS. 8A to 8G, a method of manufacturing an ink-jet head according to a third exemplary embodiment of the present invention will be described.

FIGS. 8A to 8G are schematic sectional views representing a cut surface in each process cut through A-A' of FIG. 2 and is vertical to the substrate 1.

Figure 8A:
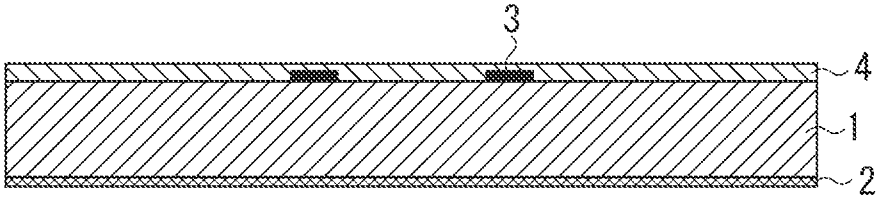
FIGS. 8A, 8B, 8C, 8D, 8E, 8F, and 8G are schematic sectional views for describing a method of manufacturing an ink-jet head according to a third exemplary embodiment of the present invention.

On the substrate 1 illustrated in FIG. 8A, a plurality of energy generating elements 3 such as heating resistors is disposed. Over the energy generating elements 3, the insulating film 4 is formed. On a back surface of the substrate 1, the oxide film 2 that works as a mask when the ink supply port is formed is provided. Then, an electrode pad (not illustrated in the drawing) that makes electrical connection is formed by deposition or plating. A wiring of the heater 3 and a semiconductor device for driving the heater 3 are not illustrated in the drawing.

Figure 8B:
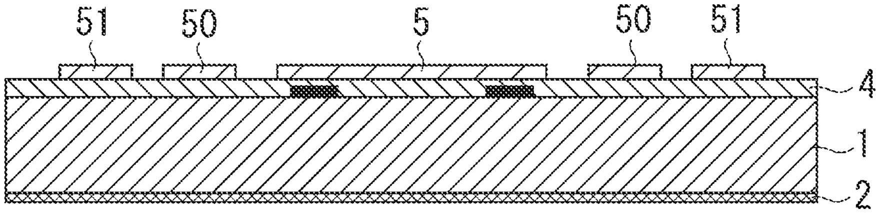

First, as illustrated in FIG. 8B, the seed layer 5 that is a metal layer made of metal or a metal compound and used for forming a mold by an electroless plating method on the substrate 1 is formed by patterning. Further, the external metal layer 50 used as an adhesion layer of the flow path wall, and a seed layer 51 that forms, together with the seed layer 5, a stress relaxation member for reducing a volume of a flow path wall member inside of the flow path wall are formed in block by patterning. More specifically, a photolithography process is used to perform patterning of the seed layer 5, the seed layer 51, and the external metal layer 50. The seed layer 5, and the external metal layer 50, and the seed layer 51 are disposed distanced from each other. At this time, if the adhesiveness between a flow path wall formed in the next process and a substrate surface is enough, the external metal layer 50 on the lower side of the flow path wall does not need to be formed.

Figure 8C:
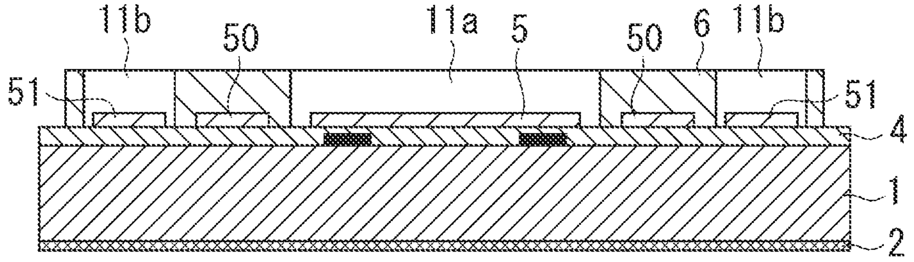
Figure 9:
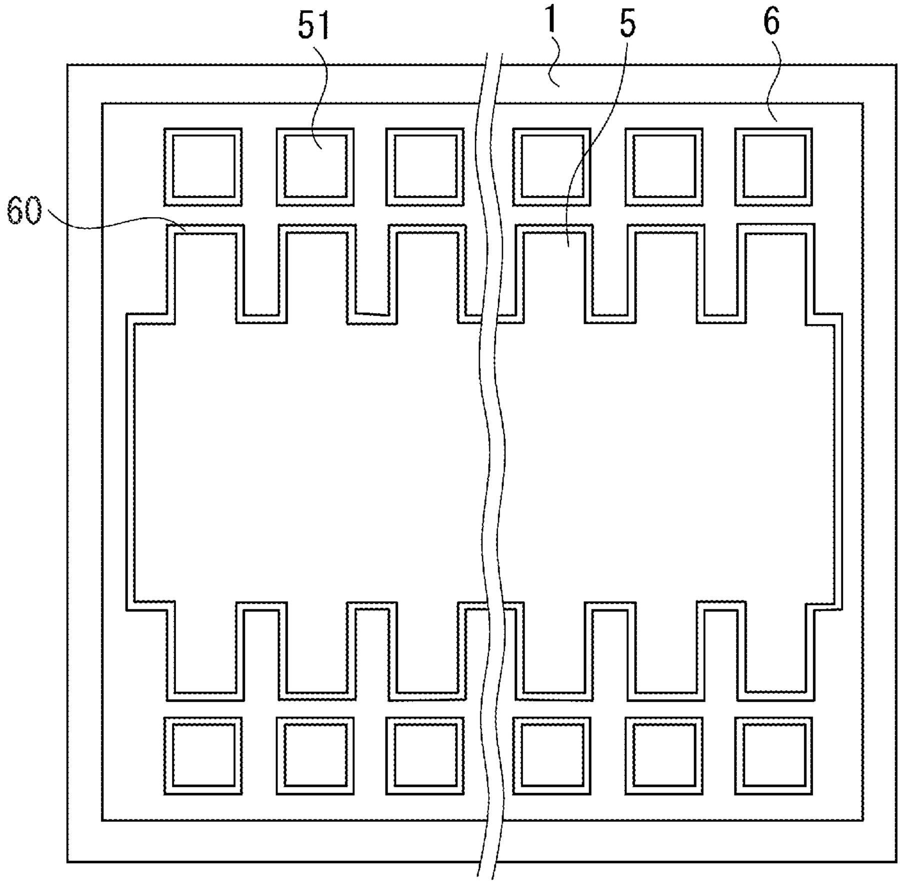
FIG. 9 is a schematic view for describing a state of a substrate in the manufacturing process in the method of manufacturing an ink-jet head according to the third exemplary embodiment of the present invention.

Next, as illustrated in FIG. 8C, a photosensitive resin that becomes a flow path wall is coated by spin coating, exposed with UV-rays or Deep UV-rays, and developed. Thus, the solid member 6 that becomes the flow path sidewall is formed. The solid member 6 is formed to surround a region 11*a* that becomes the flow path and a region 11*b* that forms a stress relaxation member. In FIG. 9, a state of a top surface after the seed layer 5 of a portion where a mold is formed, the seed layer 51 of a stress relaxation member forming portion, and the solid member 6 are formed is illustrated. Thus, inside of the solid member 6 and in a region that becomes the flow path, the seed layer 5 having a shape of the flow path is formed, and in a region where the stress relaxation member is formed, the seed layer 51 having a shape of the stress relaxation member is formed. Taking into consideration isotropic growth of plating, there may be a certain separation between the solid member 6 and the seed layer 5, and the seed layer 51 (60 of FIG. 9). The solid member 6 may be disposed to entirely cover the external metal layer 50 to come into contact with a side surface from a top surface of the external metal layer 50.

Figure 8D:
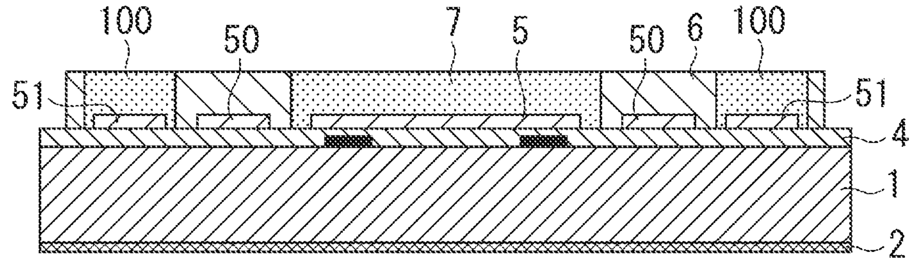

Next, as illustrated in FIG. 8D, by use of the seed layer 5 and the seed layer 51 and according to an electroless plating method, the mold 7 of the flow path and the stress relaxation member 100 are formed by a plating layer obtained by growing metal or alloy containing the metal. As a forming method, a generally known electroless plating method is used. When the electroless plating method is used, the mold 7 and the stress relaxation member 100 are selectively formed only in the seed layer. The solid member 6 works as a plating resist. By controlling a time period of the plating, the mold and the stress relaxation member 100 can be provided at a desired thickness. When the thickness is about the same as a height from a surface of the substrate 1 of the solid member 6 or slightly thinner than that, the covering photosensitive resin 8 can be readily coated later. Since the plating layer is formed flat, there is no need of particular flattening treatment on a top surface of the mold 7 and the stress relaxation member 100. However, when the mold 7 and the stress relaxation member 100 are formed at a thickness thicker than the solid member 6, the top surface of the mold 7 and the stress relaxation member 100 can be polished.

Figure 8E:
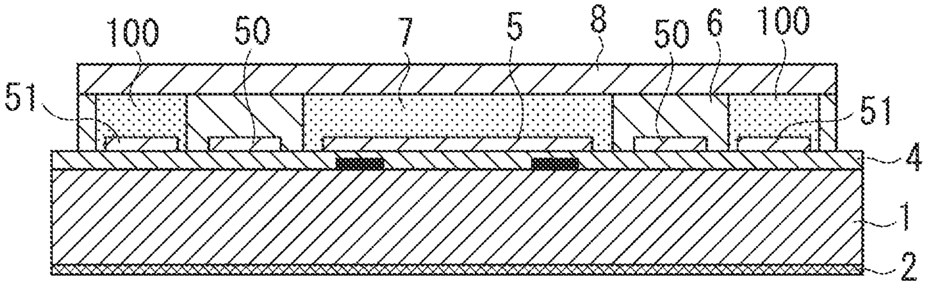

Next, as illustrated in FIG. 8E, the covering photosensitive resin 8 that is a kind of material the same as the solid member 6 is coated by spin coating. As a solvent of the covering photosensitive resin 8, a mix solvent of xylene or MIBK and diglyme is used. Since an inorganic material is formed in the mold according to an electroplating method, there is substantially no compatibility between the mold 7 and the covering photosensitive resin 8. A water repellent may be coated on the upper side of the covering photosensitive resin 8.

Figure 8F:
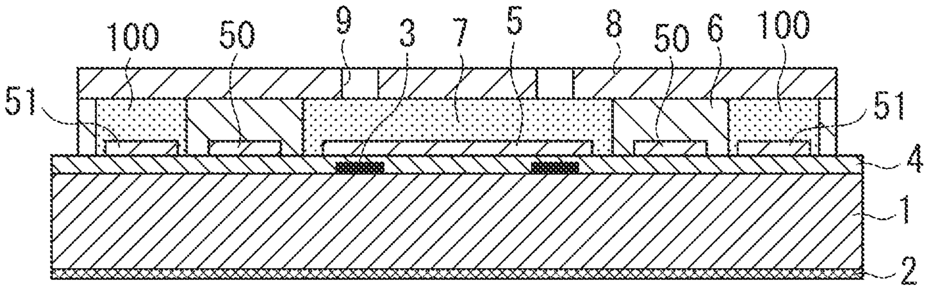

Next, as illustrated in FIG. 8F, at a position that faces the energy generating element 3 of the covering photosensitive resin 8, the ink discharge port 9 is formed. When the discharge port is formed, an exposure unit such as a stepper is used to perform exposure. When the covering photosensitive resin 8 is negative type, exposure is performed such that light does not impinge on the discharge port. After that, development is conducted and the ink discharge port 9 corresponding to each of the energy generating elements 3 is formed.

Figure 8G:
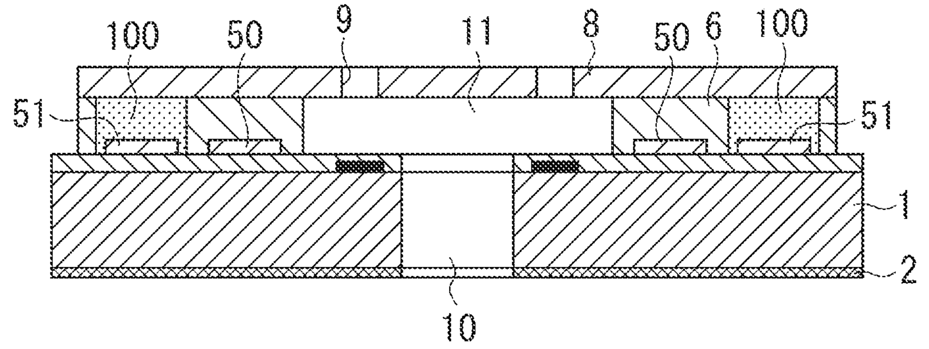

Next, as illustrated in FIG. 8G, the oxide film 2 of a portion that becomes the ink supply port 10 is patterned by a photolithography method to form the ink supply port 10. After that, the seed layer 5 and the mold 7 formed in the ink flow path are removed using a removing liquid to form the flow path 11. The mold 7 made of metal which fills a region that becomes the flow path, and the covering photosensitive resin 8 that becomes a discharge port member are inhibited from mixing with each other; accordingly, a mixture that is difficult to dissolve in the removing liquid of the mold 7 is not formed. Thus, when the mold 7 is removed, the mold 7 does not remain partially inside of the flow path and a flow path having a shape the same as the mold 7 of the flow path is formed. Further, a boundary between the mold 7 and the covering photosensitive resin 8 is distinct; accordingly, even when a concentration of the removing liquid of the mold 7 slightly fluctuates, without receiving the influence thereof, the flow path can be formed with excellent reproducibility. The substrate 1 on which a nozzle portion is formed according to the process mentioned above is cut by a dicing saw and separated into chips. Then, the substrate 1 is electrically connected to drive the energy generating elements 3. After that, a chip tank member for ink supply is connected and the ink-jet head is completed.

With reference to FIGS. 10A to 10F, a fourth exemplary embodiment of the present invention will be described. FIGS. 10A to 10F are sectional views seen at a position the same as FIGS. 8A to 8G.

Figure 10A:
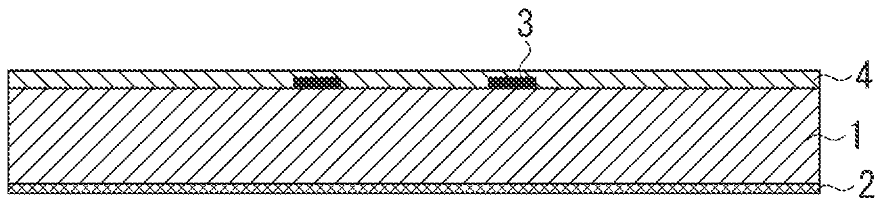
FIGS. 10A, 10B, 10C, 10D, 10E, and 10F are schematic sectional views for describing a method of manufacturing an ink-jet head according to a fourth exemplary embodiment of the present invention.

As illustrated in FIG. 10A, the substrate 1 is prepared in a manner the same as the first exemplary embodiment.

Figure 10B:
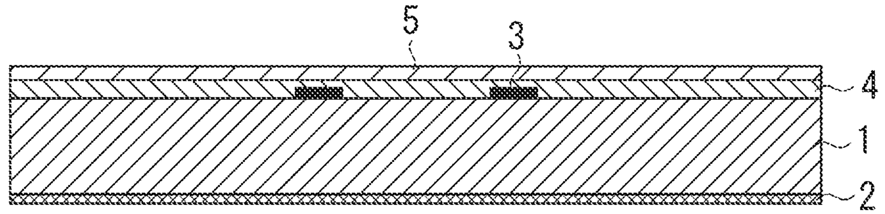

Then, as illustrated in FIG. 10B, the seed layer 5 is formed on the substrate 1. The seed layer 5, without patterning, may be wholly formed over the substrate 1.

Figure 10C:
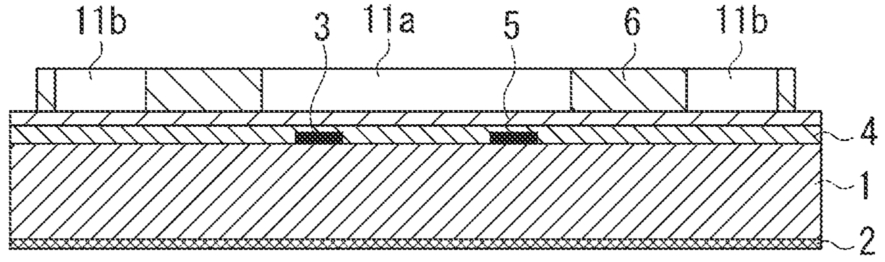
Figure 11:
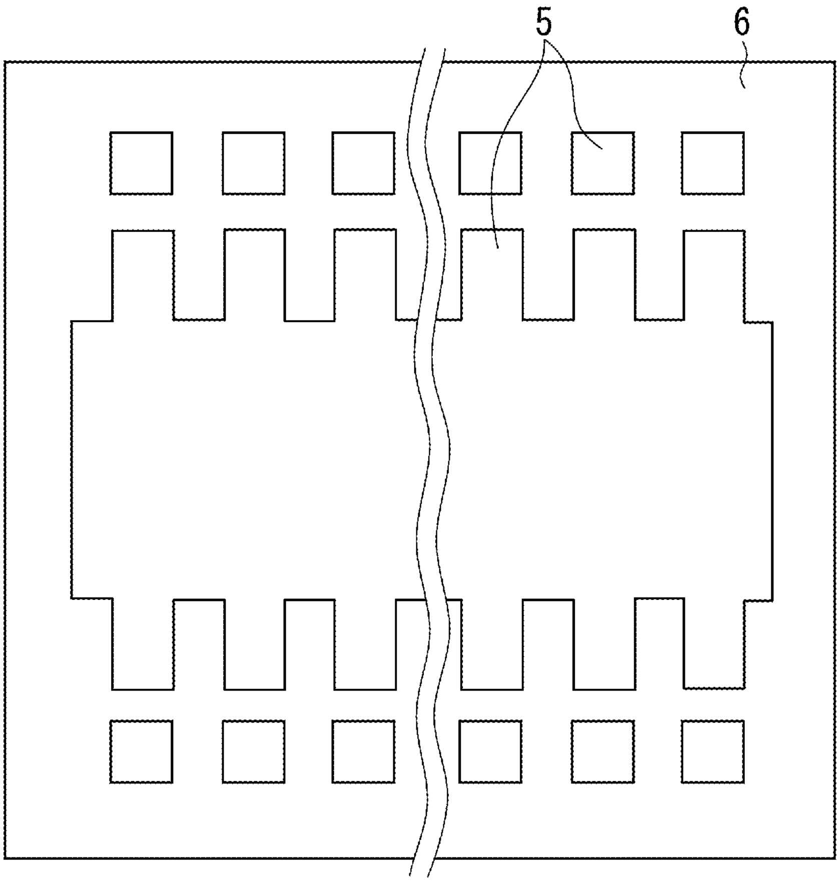
FIG. 11 is a schematic view for describing a state of a substrate in the manufacturing process in the method of manufacturing an ink-jet head according to the fourth exemplary embodiment of the present invention.

Next, as illustrated in FIG. 10C, a photosensitive resin that becomes a flow path sidewall is coated by spin coating and exposed with UV-rays or Deep UV-rays and developed. Thus, the flow path side wall and, the solid member 6 that becomes a mold for forming the stress relaxation member for reducing a volume of the flow path side wall member inside of the flow path side wall are formed. In FIG. 11, a state of a top surface after the solid member 6 is formed is illustrated. The seed layer 5 is disposed in a region 11*a* that becomes the flow path and a region 11*b* that forms the stress relaxation member to be surrounded by the solid member 6.

Further, the seed layer 5 is disposed between the solid member 6 and the substrate 1 to come into contact with both of them and also is provided outside the solid member 6.

Figure 10D:
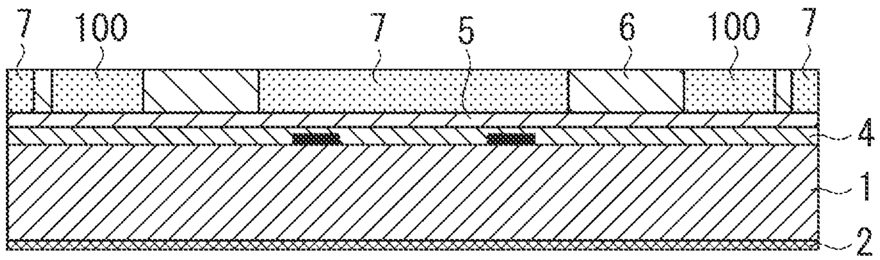

Next, as illustrated in FIG. 10D, by use of the seed layer 5 and according to an electroplating method, the mold 7 and the stress relaxation member 100 are formed. As a forming method, a generally known electroplating method is used. If the electroplating method is used, when energized, only on the seed layer and a position free from a resist pattern, a plating layer is selectively formed. The seed layer 5 outside of the solid member 6 is electrically connected with a plating terminal at an edge portion of the substrate 1 so that a current is externally supplied to perform the electroplating. Since the mold 7 and the stress relaxation member 100 are formed by plating using external electric power, the mold 7 and the stress relaxation member 100 can be formed in a shorter period of time.

Figure 10E:
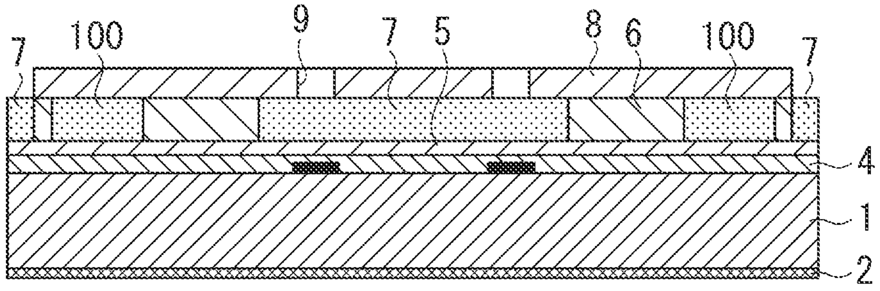

Next, as illustrated in FIG. 10E, the covering photosensitive resin 8 as a covering layer, which is a kind of material the same as the solid member 6 is coated by spin coating. As a solvent of the covering photosensitive resin 8, generally, a mix solvent of xylene or methyl isobutyl ketone (MIBK) and diglyme is used. Since a metal material is formed in the mold according to an electroplating method, there is substantially no compatibility between the mold 7 and the covering photosensitive resin 8. Inside and outside of the solid member 6, a plating layer having a height about the same as that of the solid member 6 is formed; accordingly, the covering photosensitive resin 8 is formed flat, and a distance between the discharge port 9 and the energy generating element 3 can be maintained constant within the substrate. A water repellent may be coated on the upper side of the covering photosensitive resin 8. After coating, to form the ink discharge port 9, an exposure unit such as a stepper is used to perform exposure. After that, development is performed and the ink discharge port 9 is formed.

Figure 10F:
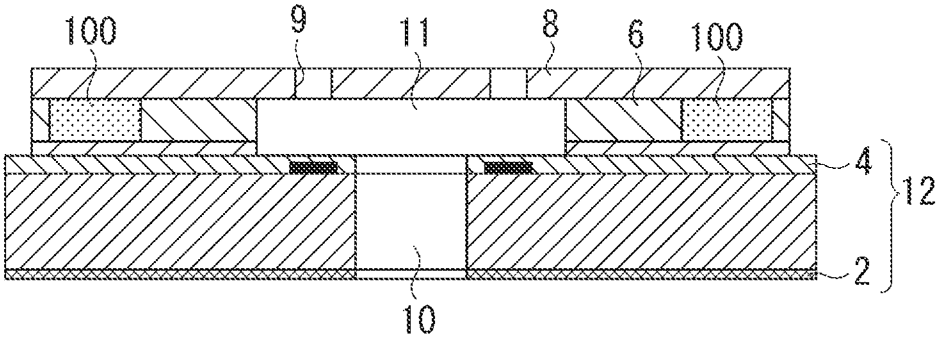

Next, as illustrated in FIG. 10F, the oxide film 2 on a back surface of the substrate 1 is patterned by a photolithography method to form the ink supply port 10. After that, the seed layer 5 and the mold 7 formed in the ink flow path and on the outer periphery of the chip are removed to form the flow path 11. At this time, also the seed layer 5 outside of the solid member 6 is removed together.

The substrate 1 on which a nozzle portion is formed according to the process mentioned above is cut by a dicing saw and separated into chips. Then, the substrate 1 is electrically connected to drive the energy generating elements 3. After that, a supporting member (tank case) for ink supply is connected and an ink-jet head is completed.

A fifth exemplary embodiment and a sixth exemplary embodiment are examples where a laser is used when a liquid discharge head is manufactured.

With reference to FIGS. 14A to 14H, a method of manufacturing an ink-jet head according to a fifth exemplary embodiment of the present invention will be described. FIGS. 14A to 14H are schematic sectional views representing a cut surface in the respective processes cut through A-A' of FIG. 2 and is vertical to the substrate 1.

Figure 14A:
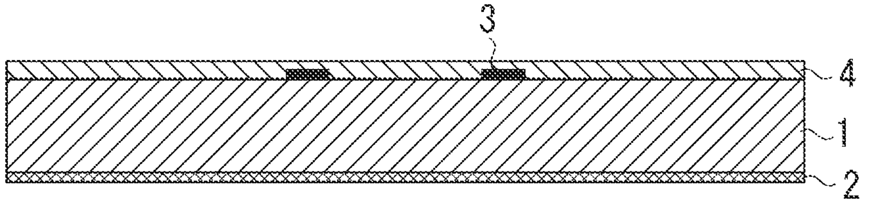
FIGS. 14A, 14B, 14C, 14D, 14E, 14F, 14G, and 14H are schematic sectional views for describing a method of manufacturing an ink-jet head according to a fifth exemplary embodiment of the present invention.

On the substrate 1 illustrated in FIG. 14A, a plurality of energy generating elements 3 such as heating resistors is disposed. Over the energy generating elements 3, an insulating film 4 is formed. On a back surface of the substrate 1, the oxide film 2 that works as a mask when the ink supply port is formed is provided. Then, an electrode pad (not illustrated in the drawing) that works for electrical connection is formed by deposition or plating. A wiring of the heater 3 and a semiconductor device for driving the heater are not illustrated in the drawing.

Figure 14B:
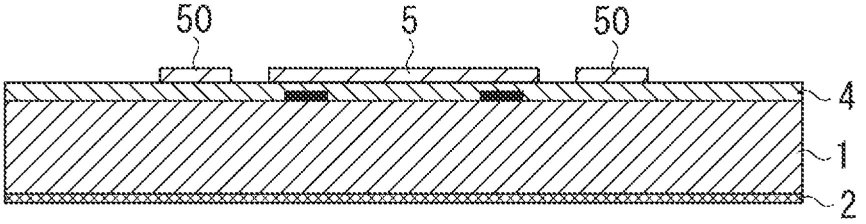

First, as illustrated in FIG. 14B, the seed layer 5 that is a metal layer made of metal or a metal compound and used for forming a mold by an electroless plating method on the substrate 1, and the external metal layer 50 used as an adhesion layer of the flow path wall are formed in block by patterning. The seed layer 5, the external metal layer 50, and a metal material layer made of metal or a metal compound are obtained by performing the patterning using a photolithography method. The seed layer 5 and the external metal layer 50 are disposed distanced from each other. At this time, if the adhesiveness between a flow path wall formed in the next process and a substrate surface is enough, the external metal layer 50 on the lower side of the flow path wall does not need to be formed.

Figure 14C:
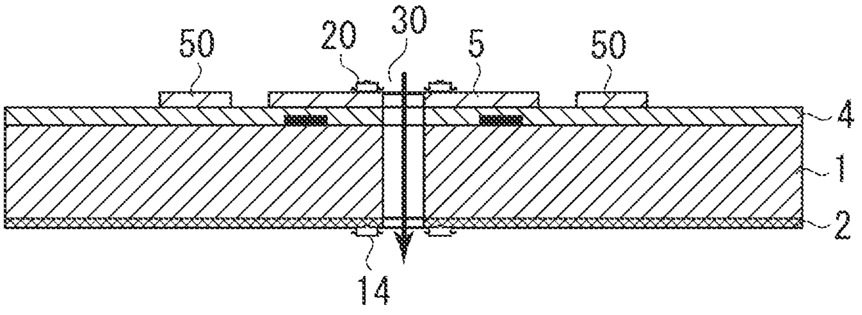

Next, as illustrated in FIG. 14C, a laser is used to perform a process from a surface on a side where the seed layer 5 is formed into the region that becomes the ink supply port. As to a laser processing depth, it is preferable that it penetrates through to a surface on the opposite side. However, if the seed layer 5, the insulating film 4, the substrate 1, and the oxide film 2 can be simultaneously penetrated, the depth does not necessarily penetrate through. A laser spot diameter is 10 to 200 μm and set to be within a frame of an ink supply port forming region, and preferably 20 to 30 μm. A position and pattern of laser processing may be a line-like pattern connected by continuous processing, or a pattern obtained by combining points, as long as these are within the ink supply port region and as long as it is a pattern that allows anisotropic etching after that to open the ink supply port. Any type of the laser can be used as long as it can process the seed layer 5, the insulating film 4, the substrate 1, and the oxide film 2. Further, during laser processing, debris 20 and 40 generated by melting stick to a circumference (both surfaces of the substrate) of a laser through-hole 30.

Figure 14D:
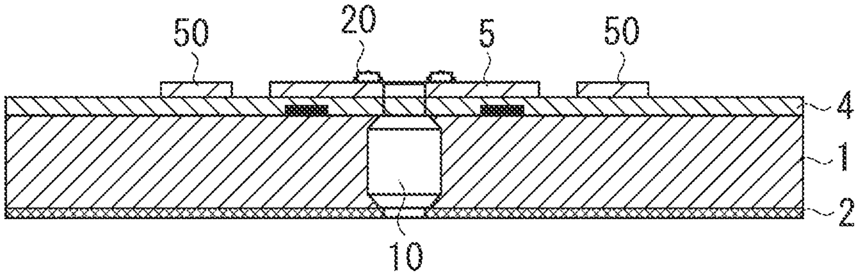

As illustrated in FIG. 14D, the ink supply port 10 is formed by an anisotropic etching method. As an etching liquid, an etching liquid obtained by mixing at a ratio of 8 to 25 mass % of TMAH relative to an aqueous solvent, and 0 to 8 mass % of silicone to the TMAH aqueous solution, and liquid temperature set to 80° C. is preferable. Alternately, if the etching liquid does not dissolve the seed layer 5, other liquid can be used. Furthermore, the etching may be conducted with a protective film such as OBC on the seed layer 5. A surface of the substrate 1 is not etched because the surface is covered with the seed layer 5 formed of metal insoluble in an alkali etching liquid or has a protective film. On the other hand, the back surface side lacks in a film that can resist the alkali etching liquid; accordingly, etching proceeds toward a surface side of the substrate 1. Simultaneously, the debris 40 generated during laser processing and stuck to a back surface of the substrate is lifted off; accordingly, on the back surface of the substrate 1 after etching, the debris 40 does not remain.

Figure 14E:
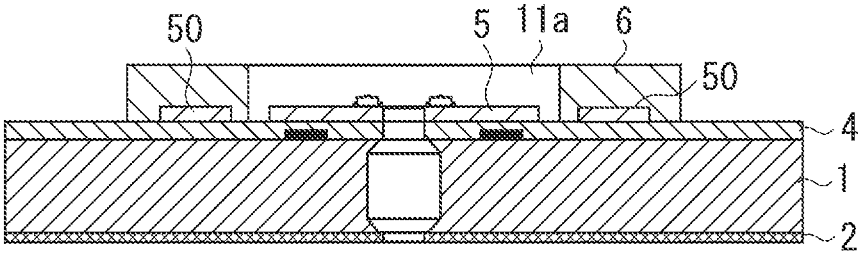
Figure 15:
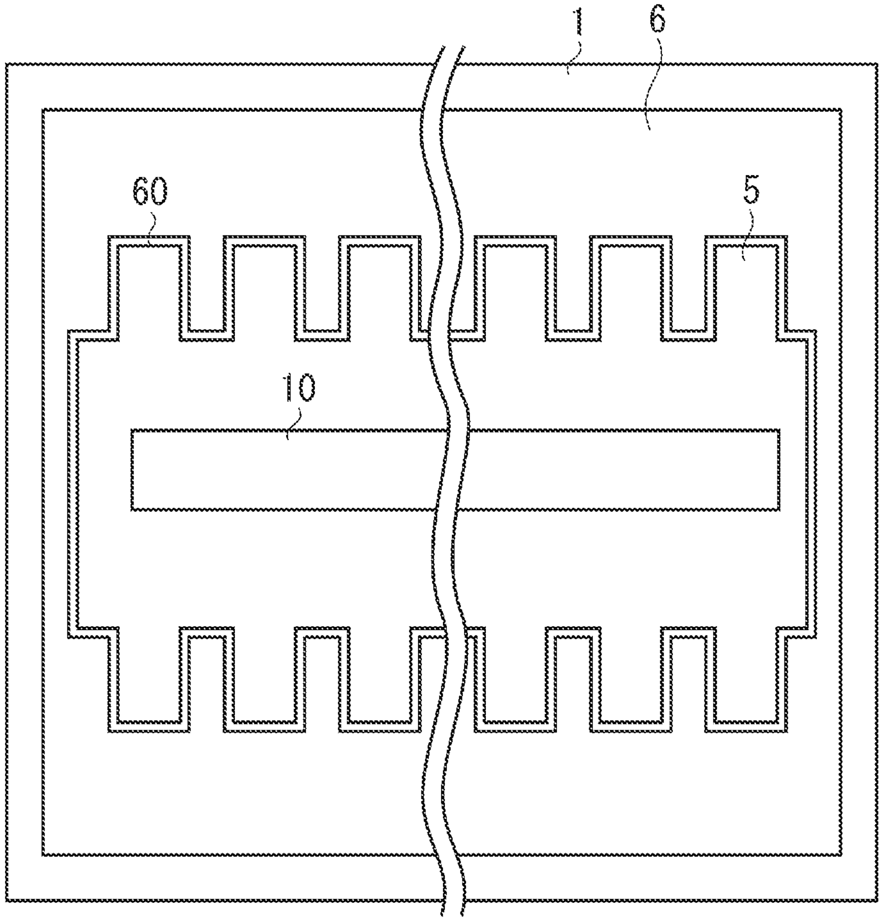
FIG. 15 is a schematic view for describing a state of a substrate in the manufacturing process in the method of manufacturing an ink-jet head according to the fifth exemplary embodiment of the present invention.

Then, as illustrated in FIG. 14E, a photosensitive dry film that becomes a flow path wall is provided and exposure and development are conducted with UV-rays or Deep UV-rays, thereby the solid member 6 that becomes a flow path sidewall is formed. The solid member 6 is formed to surround a region 11*a* that becomes a flow path. In FIG. 15, a state of a top surface after the seed layer 5 of a portion that forms a mold, and the solid member 6 are formed is illustrated. Thus, inside of the solid member 6 and in a region that becomes a flow path, the seed layer 5 having a shape of a flow path is formed. Taking into consideration isotropic growth of plating, there may be a certain separation between the solid member 6 and the seed layer 5 (60 of FIG. 15). At this time, the solid member 6 may be disposed to entirely cover the external metal layer 50 so as to come into contact with a side surface from a top surface of the external metal layer 50.

Figure 14F:
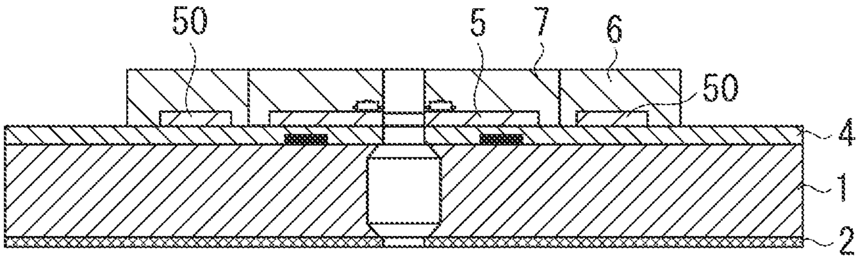

Next, as illustrated in FIG. 14F, by use of the seed layer 5 and according to an electroless plating method, the mold 7 of the flow path is formed with a plating layer obtained by growing metal or alloy containing the metal. As a forming method, a generally known electroless plating method is used. If an electroless plating method is used, the mold 7 is selectively formed only on the seed layer 5. The solid member 6 works as a plating resist. By controlling a time period of the plating, the mold can be provided at a desired thickness. When a thickness of the plating layer is about the same as a height from a surface of the substrate 1 of the solid member 6 or slightly thinner than that, a covering photosensitive dry film can be readily coated later. Since the plating layer is formed flat, there is no need of particular flattening treatment on a top surface of the mold 7. However, by forming the mold 7 at a thickness thicker than the solid member 6, the top surface of the mold 7 can be polished.

Figure 14G:
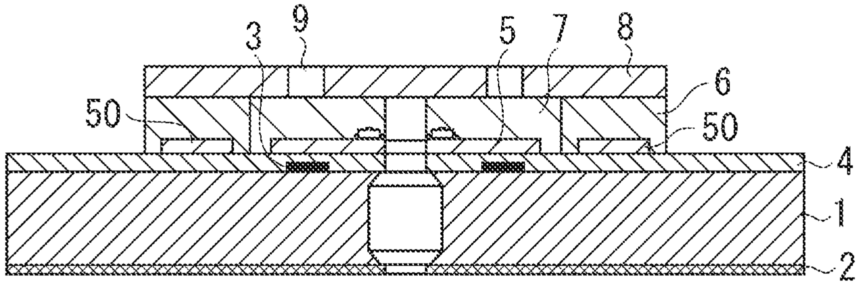

Next, as illustrated in FIG. 14G, the covering photosensitive dry film 8 that is a kind of material the same as the solid member 6 is placed. As a solvent of the covering photosensitive dry film 8, a mix solvent of xylene or MIBK and diglyme is used. Since an inorganic material is formed in the mold according to the electroless plating, there is substantially no compatibility between the mold 7 and the covering photosensitive dry film 8. A water repellent may be coated on the upper side of the covering photosensitive dry film 8.

The ink discharge port 9 is formed at a position facing the energy generating element 3 of the covering photosensitive dry film 8. When the discharge port is formed, an exposure unit such as a stepper is used to perform exposure. The covering photosensitive dry film is a negative type; accordingly, exposure is performed so that light does not impinge on the discharge port. After that, development is performed to form an ink discharge port corresponding to each of the energy generating elements 3.

Figure 14H:
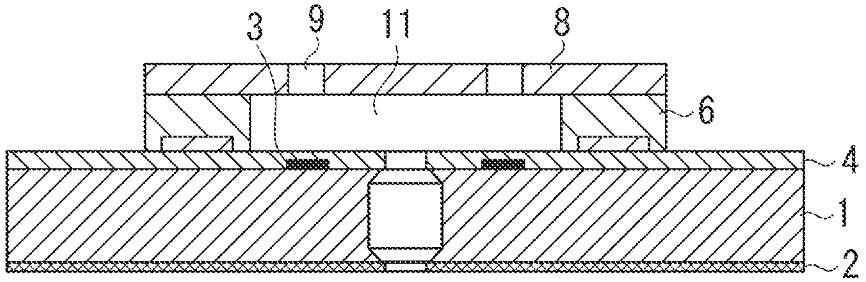

Next, as illustrated in FIG. 14H, the seed layer 5 and the mold 7, which are formed in the ink flow path are removed using a removing liquid, so that the flow path 11 is formed. At this time, also the debris 20 stuck onto the seed layer 5 is simultaneously lifted off.

Since the mold 7 made of metal filling a region that becomes a flow path and the covering photosensitive dry film 8 that becomes a discharge port member are inhibited from mixing with each other, a mixture that is difficult to dissolve in the removing liquid of the mold 7 is not formed. Thereby, also when the mold 7 is removed, the mold 7 does not remain partially inside of the flow path and a flow path having a shape the same as the mold 7 of the flow path is formed. Further, a boundary between the mold 7 and the covering photosensitive dry film 8 is distinct; accordingly, even when a concentration of the removing liquid of the mold 7 slightly fluctuates, without the influence thereof, the flow path can be formed with excellent reproducibility. The substrate 1 on which a nozzle portion is formed according to the process mentioned above is cut by a dicing saw and separated into chips. Then, the substrate 1 is electrically connected to drive the energy generating elements 3. After that, a chip tank member for ink supply is connected and the ink-jet head is completed.

In the present exemplary embodiment, on the plating layer that is a mold, the photosensitive dry film 8 is disposed, and the discharge port is patterned. Accordingly, the mold that fills a region that becomes a flow path and a covering layer that becomes a discharge port member are inhibited from mixing with each other. Further, when the mold is removed, debris generated by laser processing can be simultaneously removed, in other words, the mold hardly remains inside of the flow path. As a result, the flow path is formed into a desired shape with excellent precision, and liquid discharge heads having excellent discharge characteristics can be obtained with high yield.

In the following, with reference to examples, the present invention will be more specifically described.

With reference to FIGS. 1A to 1G, Example 1 will be described. Example 1 is an example of a method of manufacturing an ink-jet head, in which a mold is formed by an electroless plating method.

On the substrate 1 illustrated in FIG. 1A, a plurality of energy generating elements 3 such as heating resistors is disposed. As the substrate, a silicon substrate was used, and as the heater, TaSiN was used. On a back surface of the substrate 1, the oxide film 2 was formed as a mask material of an ink supply port. As a material of an electrode pad (not illustrated) that performs electrical connection, gold was used that is not eroded by ferric chloride which is used later to remove a mold. A gold pad was formed by performing the patterning by a photolithography method after depositing by a sputtering method. Further, as another method, an electroplating method may be used to form a gold bump. A wiring of the heater 3 and a semiconductor device for driving the heater 3 are not illustrated in the drawing.

Then, as illustrated in FIG. 1B, on the substrate 1 illustrated in FIG. 1A, the seed layer 5 that forms a mold and the external metal layer 50 that is an adhesion layer of a flow path wall were simultaneously formed by electroless plating, patterned by a photolithography method and a seed layer was formed. As the seed layer, an aluminum film having a thickness of 0.5 μm was formed by a sputtering method. Even when the aluminum contains a slight amount of silicon or copper, the similar result can be obtained. On the aluminum that is the seed layer, a posiresist was coated, exposed, and developed to form a resist pattern. Then, dry etching and wet etching were performed to form the aluminum in a portion that forms a mold and a portion that forms a flow path wall. In a portion that forms a mold, the seed layer 5 was formed, and in a flow path wall forming portion, the external metal layer 50 was formed.

Next, as illustrated in FIG. 1C, the solid member 6 was formed. A material for forming the solid member 6 includes an epoxy resin, a photocationic polymerization initiator, and xylene that is a solvent, and is a negative photosensitive resin. As a negative resist, a material containing 100 mass % of epoxy resin EHPE3150 (trade name, manufactured by Daicel Chemical Industries, Ltd.) and 6 mass % of photocationic polymerization catalyst SP-172 (trade name, manufactured by Asahi Denka Kogyo K. K.) was used. A photosensitive resin that becomes a flow path wall was coated by spin coating, exposed with UV-rays or Deep UV-rays, and developed. Thereby, the solid member 6 that becomes a flow path wall was formed with the sidewall held nearly vertical to a surface of the substrate 1. A height of the solid member 6 at this time was set to 10 μm. At this time, to inhibit the seed layer 5 on the lower side of the flow path wall from dissolving during removal of the mold 7 and the seed layer 5, it is preferable that the seed layer 5 of the mold 7 forming portion is formed more inside than the mold 7, and the external metal layer 50 is formed within the solid member 6.

Then, as illustrated in FIG. 1D, on the aluminum seed layer 5, the mold 7 was formed of a nickel plating layer by an electroless plating method. As a formation method, a generally known electroless plating method was used. According to the method, the oxide film formed on a surface of aluminum was removed, a zincate treatment was performed, and nickel was formed. The nickel is formed by substituting Zn stuck to a surface of aluminum and by growing according to a reduction reaction. As a treatment liquid, a drug solution manufactured by Uemura Kogyo K. K. was used. Asa pretreatment liquid, cleaner EPITHAS MCL-16 was used to etch an oxide layer on the uppermost surface of aluminum. After that, zincate treatment was performed. As a zincate treatment liquid, EPITHAS MCT-17 was used. On an aluminum pad which has undergone the zincate treatment, zinc is precipitated, and, thereon electroless nickel was electroless-plated with EPITHAS NPR-18. At this time, a deposition rate of nickel is 0.2 μm/min and nickel was precipitated to 10 μm, which was a height the same as that of a nozzle; accordingly, a time period of electroless nickel plating was 50 min. Since the plating is performed by controlling a time, a height substantially the same as the solid member 6 can be obtained. When the mold 7 is higher than the solid member 6, chemical mechanical polishing (CMP) may be used. As illustrated in the drawing, a flow path wall is vertical; accordingly, the mold formed by an electroless plating method is also formed vertical.

Next, as illustrated in FIG. 1E, the covering photosensitive resin 8 that is a kind of material the same as the flow path sidewall is coated by spin coating. The material is a negative photosensitive resin that contains 100 parts of an epoxy resin EHPE3150 by weight (trade name, manufactured by Daicel Chemical Industries, Ltd.), and 6 parts of a photocationic polymerization catalyst SP-172 by weight (trade name, manufactured by Asahi Denka Kogyo K. K.). After coating, exposure was conducted by use of an exposure unit such as a stepper to form the ink discharge port 9. Since the covering photosensitive resin 8 is negative type, exposure was conducted so that light does not impinge on the discharge port. After that, development was performed to form the ink discharge port 9.

Then, as illustrated in FIG. 1F, after the oxide film 2 was patterned by a photolithography method, the ink supply port 10 was formed. Although the ink supply port 10 illustrated in FIG. 1F was prepared by dry etching, the ink supply port 10 may be etched with an alkali aqueous solution (for example, tetramethyl ammonium or KOH). In the case of dry etching, since the oxide film 2 is thin, it is preferable to carry out etching retaining the resist used in the patterning. Further, when the ink supply port 10 is formed, it is preferable to form a protective film (not illustrated) on a surface. After that, the aluminum material that is the seed layer formed inside of the ink flow path and nickel formed by an electroless plating method were etched with ferric chloride and removed.

The substrate 1 on which a nozzle portion was formed according to the process mentioned above was cut by a dicing saw and separated into chips. Then, the substrate 1 was electrically connected to drive the energy generating element 3 and a chip tank member for ink supply was connected to complete the ink-jet head.

With reference to FIGS. 4A to 4F, Example 2 of the present invention will be described.

As illustrated in FIG. 4A, in a manner similar to Example 1, the substrate 1 was prepared.

As illustrated in FIG. 4B, the seed layer 5 was formed on the substrate 1 by a sputtering method. As a material of the seed layer, gold was used. A thickness thereof was set to 0.3 μm.

Next, as illustrated in FIG. 4C, the solid member 6 that becomes the flow path wall was formed. A material that forms the solid member 6 was the same as that of Example 1.

Then, as illustrated in FIG. 4D, as the mold 7, a gold plating layer was formed on the seed layer 5. As a forming method, a generally known electroplating method was used. As a plating liquid, MICROFAB Au100 (trade name, manufactured by ELECTROPLATING ENG OF JAPAN CO.) mainly made of gold sulfite was used. At this time, a deposition rate of gold is 0.3 μm/min and gold is deposited up to a height of 14 μm, similar to that of the flow path; accordingly, it took 46 min as a time period of electroplating with gold. Although gold was used in the present example, as long as the material that does not mix with an organic material coated thereon is used, a substantial function can be satisfied. Other than the above, as examples of the plating materials, copper or nickel may be selected. In the case of copper plating, a copper plating liquid called MICROFAB Cu300 (trade name, manufactured by ELECTROPLATING ENG OF JAPAN CO.) mainly made of copper sulfate is used. At this time, a deposition rate of copper is about 0.2 to 0.5 μm/min, temporarily set to 0.4 μm/min, and copper is deposited up to a height of 14 μm similar to that of the flow path; accordingly, it takes a time period of about 35 min. In the case of Ni plating, a plating liquid called MICROFAB Ni100 (trade name, manufactured by ELECTROPLATING ENG OF JAPAN CO.) mainly made of acidic sulfamic acid is used. At this time, a deposition rate of nickel is about 0.2 to 0.5 μm/min. If it is temporarily set to 0.4 μm/min, nickel is deposited up to a height of 14 μm similar to that of the flow path; accordingly, it takes a time period of about 35 min. In all cases, the plating is conducted by controlling a time according to the flow path height; accordingly, the plating can be formed to a height about the same as that of the flow path wall 6. Nevertheless, when the height does not conform to the predetermined value because of manufacture fluctuation, by setting a height of the mold 7 lower than the flow path wall 6, the process can be forwarded to a next process. Conversely, when the height of the mold 7 is higher than that of the flow path wall 6, by polishing the plating to a height of the flow path by use of the chemical mechanical polishing (CMP), the process can be forwarded to the next process. As to a shape in a width direction of the plating mold, as illustrated in the drawing, a side surface of the flow path wall is almost vertical to a substrate surface; accordingly, also the mold formed by an electroplating method can be made almost vertical to the substrate surface.

Next, as illustrated in FIG. 4E, the ink discharge port 9 was formed in a manner similar to Example 1. Subsequently, as illustrated in FIG. 4F, the ink supply port 10 was formed according to a method similar to Example 1. After that, gold in the seed layer formed in the ink flow path, and the gold mold formed by an electroplating method are removed with an iodine/potassium iodide solution. In the present example, AURUM 302 (trade name, manufactured by Kanto Kagaku) was used. Furthermore, in the case of dissolving the copper, an initial build-up liquid called E-PROCESS WL (trade name, manufactured by Meltex Inc.) is used. Further, in the case of dissolving the Ni, a Ni selective etching liquid NC-A (trade name, manufactured by NIHON KAGAKU SANGYO CO., LTD.) can be used.

Following processes were conducted in a manner similar to Example 1.

It was confirmed that there is no residue considered to be a compatible layer with the mold in the discharge port member 8 of the ink-jet head obtained according to the present example.

Figure 6A:
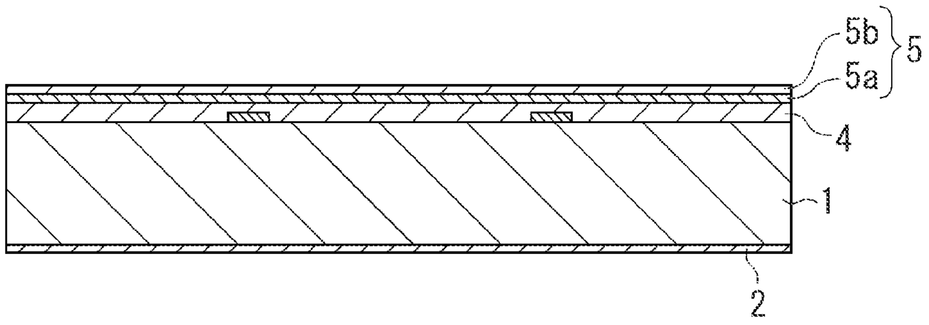
FIGS. 6A, 6B, and 6C are schematic sectional views for describing a method of manufacturing an ink-jet head according to Example 3 of the present invention.
Figure 6B:
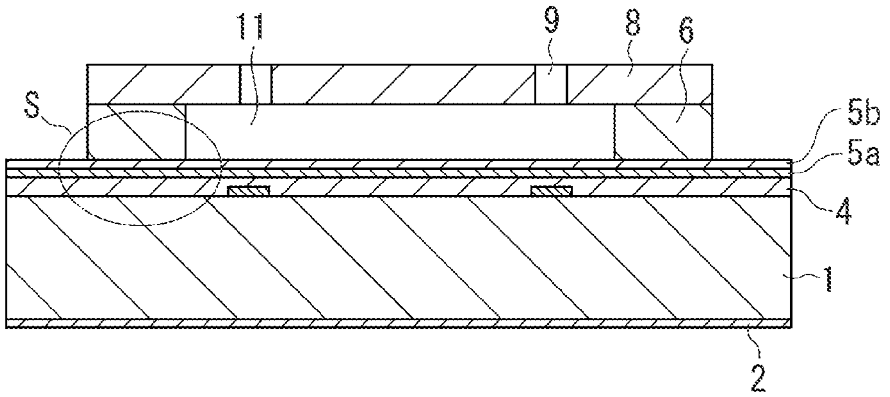
Figure 6C:
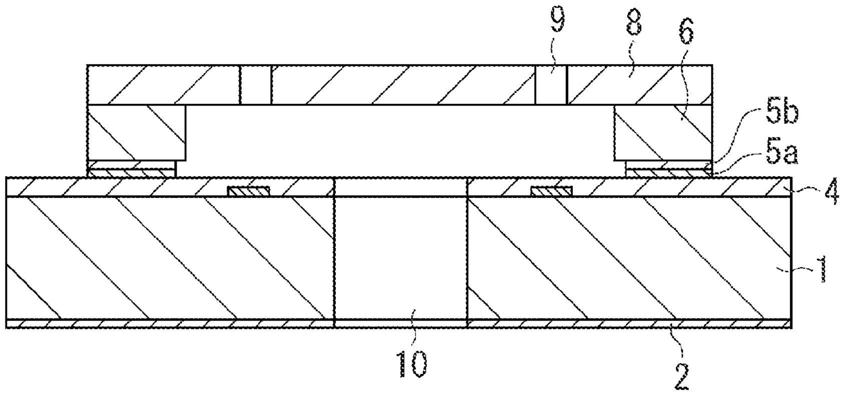

With reference to FIGS. 6A to 6C and FIGS. 7A and 7B, Example 3 will be described. FIGS. 6A to 6C are sectional views the same as FIGS. 1A to 1G, and FIGS. 7A and 7B are enlarged diagrams of a bottom portion of flow path wall of FIG. 6B.

The substrate 1 provided with the seed layer 5 for plating in a manner similar to Example 2 was prepared. In the present example, the seed layer 5 was formed into two layers of a first metal layer 5*a* (lower layer) and a second metal layer 5*b* (upper layer) (FIG. 6A). As the first metal layer 5*a*, copper was used, and as the second metal layer 5*b*, gold was used. As a barrier layer for inhibiting copper and gold from diffusing, a TiW film of 0.2 μm as a barrier layer was deposited before deposition of the first and second metal layers by a sputtering method on the substrate surface (not illustrated in the drawing). A film thickness of copper of the first metal layer was set to 0.3 μm, and a film thickness of gold of the second metal layer was set to 0.05 μm. The thickness of the second metal layer 5*b* is preferably as thin as possible from the viewpoint of undercutting during removal. However, the sufficient thickness is necessary to cover a level difference of a base, namely, it is preferable to be 0.03 μm to 0.1 μm. Any combination of materials of the first and second metal layers, as long as the selectivity of the etching liquid during removal of the seed layer can be obtained, can be selected without problem.

After that, in a manner similar to Example 2, formation of a mold of a flow path with the plating layer, formation of the flow path wall member 6 and the discharge port plate portion 8, and removal of the mold were performed to form the flow path (FIG. 6B).

Figure 7A:
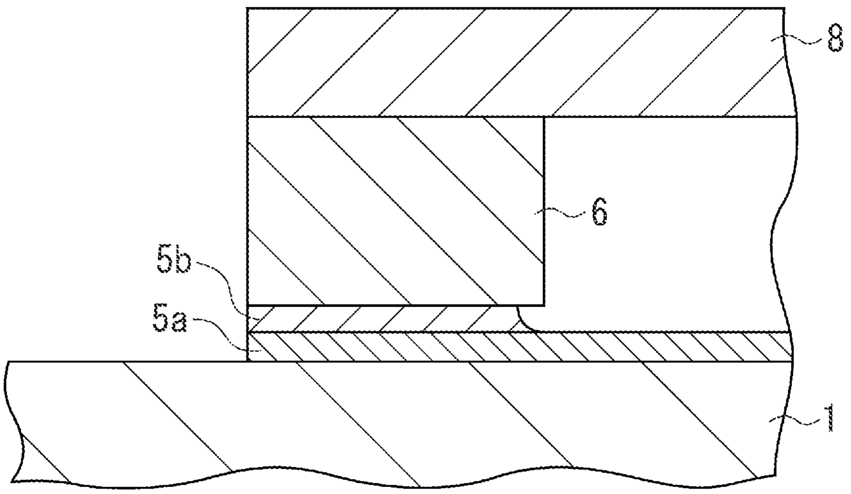
FIGS. 7A and 7B are schematic sectional views for describing a method of manufacturing an ink-jet head according to the Example 3 of the present invention.
Figure 7B:
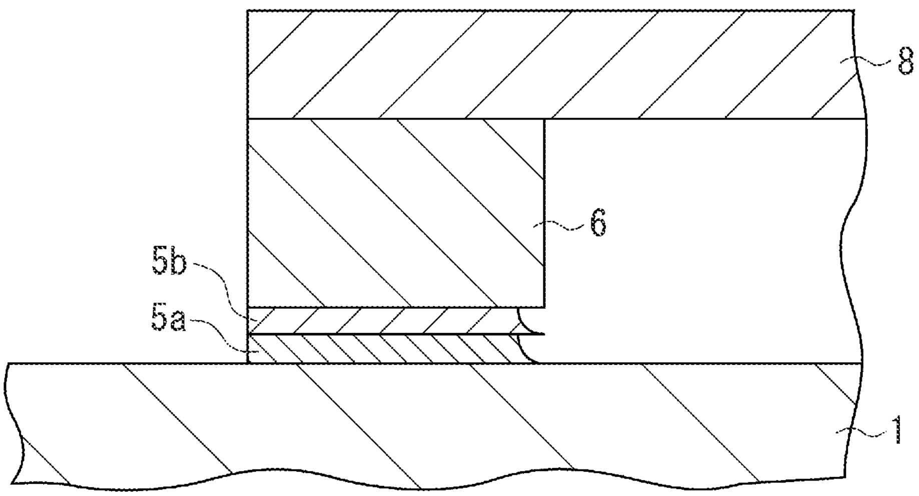

Then, gold of the second metal layer 5*b* formed inside of the flow path 11 and the gold mold formed by an electroplating method were etched with an iodine/potassium iodide solution and removed. In the present example, AURUM 302 (trade name, manufactured by Kanto Kagaku) was used (FIG. 7A). By removing the second metal layer 5*b*, on the lower side of the flow path wall 6, an under-cut was formed. Since the second metal layer 5*b* is thin, an amount of the undercut thereof is small.

Then, copper of the first metal layer 5*a* was removed with an etching liquid that is mainly made of ammonium copper complex and selectively etches copper relative to gold (FIG. 7B), and a state of FIG. 6C was obtained.

After that, in a manner similar to Example 2, the ink-jet head was formed.

According to the present example, by use of a seed layer made of two layers that are selectively removable from each other, an amount of undercut of a bottom portion of the flow path wall 6 can be reduced than in the case of one layer. Thereby, even when the thick seed layer is formed to reduce a resistance value of the seed layer 5 for electroplating, bonding strength between the flow path wall 6 and the substrate 1 can be secured.

It was confirmed that in the discharge port member 8 of the ink-jet head obtained according to the present example, there is no residue considered to be a layer compatible with the mold.

Example 4 will be described. In place of conducting plating by use of the seed layer 5, on a region that becomes a flow path and the solid member, gold was stacked by a sputtering method, a top surface thereof was polished to form a mold 7 made of gold. In the proceeding other than the above, similar to Example 2, the ink-jet head was formed.

It was confirmed that in the discharge port member 8 of the ink-jet head obtained according to the present example, there is no residue considered to be a layer compatible with the mold.

With reference to FIGS. 8A to 8G, Example 5 will be described. Example 5 is an example of a method of manufacturing an ink-jet head, which forms a mold by an electroless plating method.

On the substrate 1 illustrated in FIG. 8A, a plurality of energy generating elements 3 such as heating resistors is disposed. As the substrate, a silicon substrate was used, and as a heater, TaSiN was used. On a back surface of the substrate 1, the oxide film 2 was formed as a mask material of the ink supply port. As a material of an electrode pad (not illustrated) for electrical connection, gold was used that is not eroded by ferric chloride that was used later to remove a mold. A gold pad was formed in such a manner that after depositing by a sputtering method, a photolithography method was used to perform the patterning. Further, as another method, an electroplating method may be used to form a gold bump. A wiring of the heater 3 and a semiconductor device for driving the heater are not illustrated in the drawing.

Then, as illustrated in FIG. 8B, on the substrate illustrated in FIG. 8A, the seed layer 5 that forms a mold by an electroless plating method was formed and the patterning was carried out by a photolithography method to form the seed layer. Furthermore, simultaneously with the seed layer 5, a seed layer 51 that forms a stress relaxation member for reducing a volume of a flow path member inside of a flow path wall and the external metal layer 50 that is an adhesion layer of the flow path wall were formed and patterned by a photolithography method to form the seed layer. As the seed layer, an aluminum film having a thickness of 0.5 μm was formed by a sputtering method. Even when the aluminum contains a slight amount of silicon or copper, the similar result can be obtained. On the aluminum that is the seed layer, a posiresist was coated, exposed, and developed to form a resist pattern. Then, by dry etching and by wet etching, the aluminum was formed in a portion that forms a mold, a portion that forms a stress relaxation member, and a portion that forms a flow path wall. The portion that forms a mold was the seed layer 5, the portion that forms a stress relaxation member was the seed layer 51, and the portion that forms a flow path wall was the external metal layer 50.

Next, as illustrated in FIG. 8C, the solid member 6 was formed. A material for forming the solid member 6 includes an epoxy resin, a photocationic polymerization initiator, and xylene that is a solvent, and is a negative photosensitive resin. As a negative resist, a material containing 100 mass % of epoxy resin EHPE3150 (trade name, manufactured by Daicel Chemical Industries, Ltd.) and 6 mass % of photocationic polymerization catalyst SP-172 (trade name, manufactured by Asahi Denka Kogyo K. K.) was used. The photosensitive resin that becomes the flow path wall was coated by spin coating, exposed with UV-rays or Deep UV-rays, and developed. Thereby, the solid member 6 that becomes a flow path wall was formed with the sidewall thereof held nearly vertical to a surface of the substrate 1. A height of the solid member 6 at this time was set to 10 μm. At this time, to inhibit the seed layer 5 on the lower side of the flow path wall from dissolving during removal of the mold 7 and the seed layer, it is preferable that the seed layer 5 is formed more inside than the mold 7, the seed layer 51 is formed more inside than the stress relaxation member 100, and the external metal layer 50 is formed within the solid member 6.

Then, as illustrated in FIG. 8D, on the aluminum seed layer 5 and on the aluminum seed layer 51, the mold 7 and the stress relaxation member 100, which are made of a nickel plating layer, were formed by an electroless plating method. As a formation method, a generally known electroless plating method was used. According to the method, the oxide film formed on a surface of aluminum was removed, a zincate treatment was performed, and then nickel was formed. The nickel is formed by substituting Zn stuck onto a surface of aluminum, followed by growing according to a reduction reaction. As a treatment liquid, a drug solution manufactured by Uemura Kogyo K. K. was used. As a pretreatment liquid, cleaner EPITHAS MCL-16 was used to etch the oxide layer on the uppermost surface of aluminum. After that, the zincate treatment was performed. As a zincate treatment liquid, EPITHAS MCT-17 was used. On an aluminum pad which has undergone the zincate treatment, zinc was precipitated, and, thereon electroless nickel was plated with EPITHAS NPR-18. At this time, a deposition rate of nickel was 0.2 μm/min and nickel was precipitated to a height of 10 μm similar to that of a nozzle; accordingly, a time period of electroless nickel plating was 50 min. Since the plating is performed by controlling a time, a height substantially the same as the solid member 6 can be obtained. When the mold 7 and the stress relaxation member 100 are higher than the solid member 6, chemical mechanical polishing (CMP) may be used. As illustrated in the drawing, a flow path wall is vertical; accordingly, the mold 7 and the stress relaxation member 100 formed by an electroless plating method are also formed vertical.

Next, as illustrated in FIG. 8E, the covering photosensitive resin 8 that is a kind of material similar to the flow path sidewall was coated by spin coating. The material is a negative photosensitive resin and contains 100 parts of an epoxy resin EHPE3150 (trade name, manufactured by Daicel Chemical Industries, Ltd.) by weight, and 6 parts of a photocationic polymerization catalyst SP-172 (trade name, manufactured by Asahi Denka Kogyo K. K.) by weight. After coating, exposure was conducted by use of an exposure unit such as a stepper to form the ink discharge port 9. Since the covering photosensitive resin 8 is a negative type, exposure was conducted so that light does not impinge on the discharge port. After that, development was performed to form the ink discharge port 9.

Then, as illustrated in FIG. 8F, after the oxide film 2 was patterned by a photolithography method, the ink supply port 10 was formed. Although the ink supply port 10 illustrated in FIG. 8F was prepared by dry etching, it may be etched with an alkali aqueous solution (for example, tetramethyl ammonium or KOH). In the case of dry etching, since the oxide film is thin, it is preferable to carry out etching retaining the resist used in the patterning remained. Further, when the ink supply port is formed, it is preferable to form a protective film (not illustrated in the drawing) on a surface. After that, the aluminum material that is the seed layer formed in the ink flow path and nickel formed by an electroless plating method were etched with ferric chloride and removed.

The substrate 1 on which a nozzle portion was formed according to the process mentioned above was cut by a dicing saw and separated into chips. Then, the substrate 1 was electrically connected to drive the energy generating elements 3. After that, a chip tank member for ink supply was connected to complete the ink-jet head was.

It was confirmed that in the discharge port member 8 of the ink-jet head obtained according to the present example, there is no residue considered to be a layer compatible with the mold.

With reference to FIGS. 10A to 10F, Example 6 of the present invention will be described.

As illustrated in FIG. 10A, in a manner similar to Example 5, the substrate 1 was prepared. Then, as illustrated in FIG. 10B, the seed layer 5 was deposited on the substrate 1 by a sputtering method. As a material of the seed layer, gold was used. A thickness thereof was set to 0.3 μm.

Next, as illustrated in FIG. 10C, the solid member 6 that becomes the flow path wall was formed. A material that forms the solid member was the same as that of Example 5. Then, as illustrated in FIG. 10D, on the seed layer 5, a gold plating layer as the mold 7 and the stress relaxation member 100 was formed. As a forming method, a generally known electroplating method was used. As a plating liquid, MICROFAB Au100 (trade name, manufactured by ELECTROPLATING ENG OF JAPAN CO.) mainly made of gold sulfite was used. At this time, a deposition rate of gold is 0.3 μm/min and gold is deposited up to a height similar to that of the flow path; accordingly, it took 46 min as a time period of electroplating of gold.

Next, as illustrated in FIG. 10E, the ink discharge port 9 was formed in a manner similar to Example 5. Subsequently, as illustrated in FIG. 10F, the ink supply port 10 was formed in a manner similar to Example 5. After that, gold of the seed layer formed inside of the ink flow path, and the gold mold formed by an electroplating method are removed with an iodine/potassium iodide solution. In the present example, when the gold plating is removed, AURUM 302 (trade name, manufactured by Kanto Kagaku) was used. Furthermore, in the case of dissolving copper, an initial build-up liquid called E-PROCESS WL (trade name, manufactured by Meltex Inc.) is used. Still furthermore, in the case of dissolving Ni, a Ni selective etching liquid NC-A (trade name, manufactured by NIHON KAGAKU SANGYO CO., LTD.) can be used. Processes after that were the same as Example 5.

It was confirmed that there is no residue considered to be a compatible layer with the mold in the discharge port member 8 of the ink-jet head obtained according to the present example.

Figure 12A:
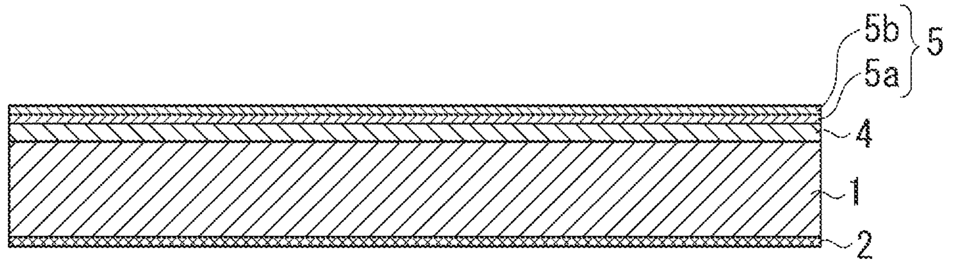
FIGS. 12A, 12B, and 12C are schematic sectional views for describing a method of manufacturing an ink-jet head according to Example 7 of the present invention.
Figure 12B:
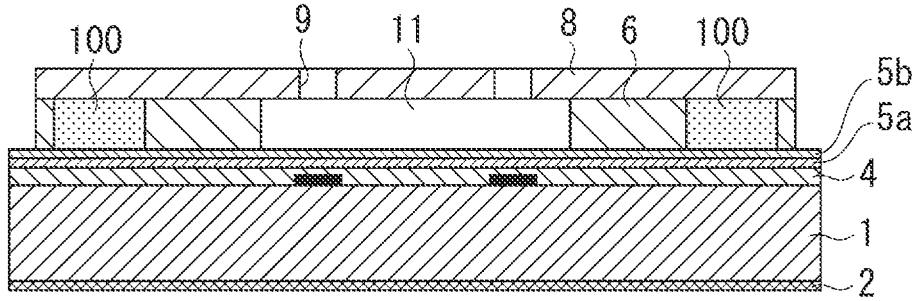
Figure 12C:
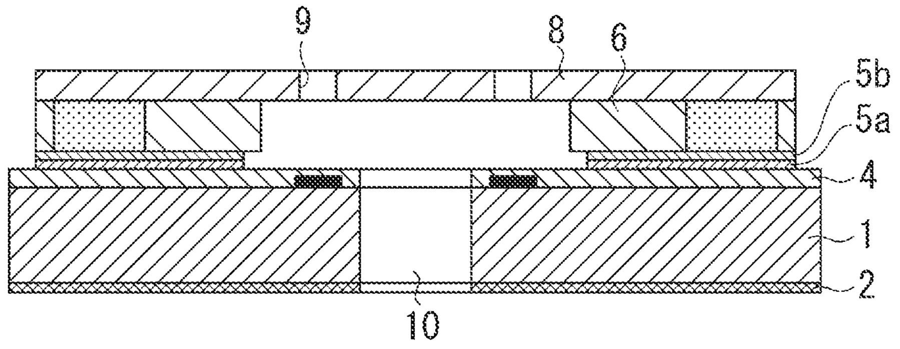

With reference to FIGS. 12A to 12C and FIGS. 13A and 13B, Example 7 will be described. FIGS. 12A to 12C are sectional views similar to FIGS. 8A to 8G, and FIGS. 13A and 13B are enlarged views of a bottom of flow path wall of FIG. 12B.

In a manner similar to Example 6, the substrate 1 provided with the seed layer 5 for plating was prepared. However, in the present example, the seed layer 5 was formed of two layers of the first metal layer 5*a* (lower layer) and the second metal layer 5*b* (upper layer) (FIG. 12A). As the first metal layer 5*a*, copper was used, and as the second metal layer 5*b*, gold was used. As a barrier layer for inhibiting copper and gold from diffusing, before deposition of the first and second metal layers, a TiW film of 0.2 μm was deposited by a sputtering method on a substrate surface (not illustrated). A film thickness of copper of the first metal layer was set to 0.3 μm, and a film thickness of gold of the second metal layer was set to 0.05 μm. The thickness of the upper layer seed layer 5*b* is preferably as thin as possible from the viewpoint of undercutting during removal. However, the sufficient thickness is necessary to cover a level difference of a base, namely, preferable to be 0.03 μm to 0.1 μm. Any combination of materials of the first and second metal layers, as long as the selectivity of the etching liquid during removal of the seed layer can be obtained, can be selected without problem.

After that, in a manner similar to Example 6, formation of the mold of the flow path and the stress relaxation member with a plating layer, formation of the flow path wall member 6 and the discharge port plate portion 8, and removal of the mold were performed to form the flow path 11 (FIG. 12B).

Figure 13A:
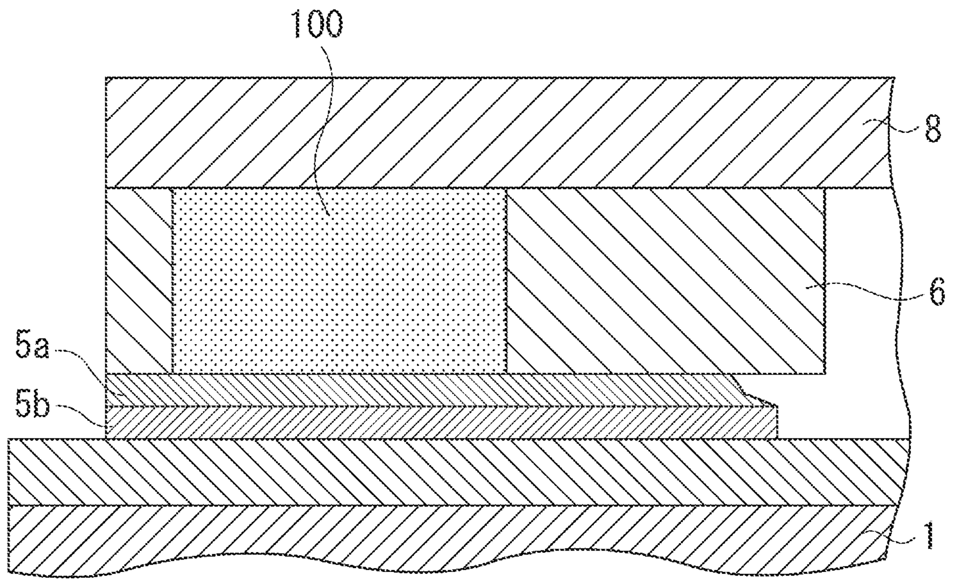
FIGS. 13A, and 13B are schematic sectional views for describing a method of manufacturing an ink-jet head according to Example 7 of the present invention.
Figure 13B:
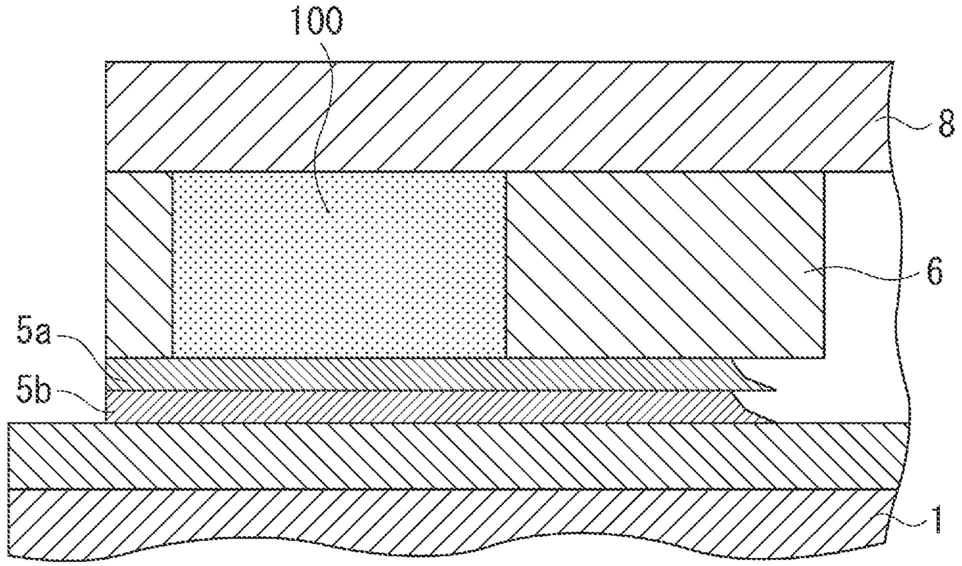

Then, gold of the second metal layer 5*b* formed inside of the flow path 11 and the mold of gold formed by an electroplating method were etched with an iodine/potassium iodide solution and removed (FIG. 13A). This time, AURUM 302 (trade name, manufactured by Kanto Kagaku) was used. By removing the second metal layer 5*b*, on the lower side of the flow path wall 6, an undercut was formed. However, since the second metal layer 5*b* is thin, an amount of the undercut is small. After that, the first metal layer 5*a* was removed with an etching liquid that is mainly made of ammonium copper complex salt and selectively etches copper relative to gold (FIG. 13B), and a state of FIG. 12C was obtained. After that, in a manner similar to Example 6, the ink-jet head was formed.

According to the present example, by use of a seed layer of two layers that are selectively removable each other, an amount of the undercut of a bottom portion of the flow path wall 6 can be reduced more than in the case of one layer. Thereby, even when the thick seed layer 5 is formed to reduce a resistance value of the seed layer 5 for electroplating, bonding strength between the flow path wall 6 and the substrate 1 can be secured.

It was confirmed that in the discharge port member 8 of the ink-jet head obtained according to the present example, there is no residue considered to be a layer compatible with the mold.

Example 8 will be described. In place of conducting plating by use of the seed layer 5, on a region that becomes the flow path, a region that becomes the stress relaxation member, and the solid member 6, gold was stacked by a sputtering method, a top surface thereof was polished to form the mold 7 made of gold. In the processing other than the above, similar to Example 6, the ink-jet head was formed.

It was confirmed that in the discharge port member 8 of the ink-jet head obtained according to the present example, there is no residue considered to be a layer compatible with the mold.

With reference to FIGS. 14A to 14H, Example 9 will be described. Example 9 is an example of a method of manufacturing an ink-jet head, which forms a mold by use of an electroless plating method.

On the substrate 1 illustrated in FIG. 14A, a plurality of energy generating elements 3 such as heating resistors is disposed. As the substrate, a silicon substrate was used, and as a heater, TaSiN was used. On a back surface of the substrate 1, the oxide film 2 was formed as a mask material of the ink supply port. As a material of an electrode pad (not illustrated) for electrical connection, gold was used that is not eroded by ferric chloride which is used to remove the mold. A gold pad was formed in such a manner that after depositing by a sputtering method, a photolithography method was used to perform patterning. Further, as another method, an electroplating method may be used to form a gold bump. A wiring of the heater 3 and a semiconductor device for driving the heater are not illustrated in the drawing.

Then, as illustrated in FIG. 14B, on the substrate 1 illustrated in FIG. 14A, the seed layer 5 which mold is formed by an electroless plating method and the external metal layer 50 that is an adhesion layer of the flow path wall were simultaneously formed. Then, the patterning is performed by a photolithography method to form the seed layer. As the seed layer, an aluminum film having a thickness of 0.5 μm was formed by a sputtering method. Even when the aluminum contains a slight amount of silicon or copper, the similar result can be obtained. On the aluminum that is the seed layer, a posiresist was coated, exposed, and developed to form a resist pattern. Then, by dry etching and by wet etching, the aluminum was formed into a portion that forms the mold, and a portion that forms the flow path wall. In a portion that forms the mold, the seed layer 5 was formed, and in a portion that forms the flow path wall, the external metal layer 50 was formed.

Next, as illustrated in FIG. 14C, from the substrate surface on which energy generating elements 3 were formed, into the region that becomes the ink supply port, laser processing was performed. As to a process depth, a laser throughhole 30 was formed by penetrating through to a surface on the opposite side. A laser spot diameter was controlled to be 30 μm. A laser processing pattern was formed such that points are arranged in a straight line in the ink supply port forming region. As a type of a laser, a YAG laser was used.

Next, as illustrated in FIG. 14D, the ink supply port 10 was formed by an anisotropic etching method. An etching liquid obtained by mixing 22 mass % of TMAH relative to an aqueous solvent was used. The etching was conducted at a liquid temperature of 83° C. When the ink supply port is formed, it is preferable to form a protective film (not illustrated) on a surface.

Next, as illustrated in FIG. 14E, the solid member 6 was formed. A material for forming the solid member 6 is a negative photosensitive dry film that includes an epoxy dry film, a photocationic polymerization initiator, and xylene that is a solvent. As a negative resist, a material containing 100 mass % of epoxy dry film EHPE3150 (trade name, manufactured by Daicel Chemical Industries, Ltd.) and 6 mass % of photocationic polymerization catalyst SP-172 (trade name, manufactured by Asahi Denka Kogyo K. K.) was used. The photosensitive dry film that becomes the flow path wall was provided, exposed with UV-rays or Deep UV-rays, and developed. Thereby, the solid member 6 that becomes the flow path wall was formed such that the sidewall is nearly vertical to a surface of the substrate 1. A height of the solid member 6 at this time was set to 10 μm. At this time, to inhibit the seed layer 5 on the lower side of the flow path wall from dissolving during removal of the mold 7 and the seed layer 5, it is preferable that the seed layer 5 of a mold 7 forming portion is formed more inside than the mold 7, and the external metal layer 50 is formed within the solid member 6.

Then, as illustrated in FIG. 14F, on the aluminum seed layer 5, the mold 7 was formed of a nickel plating layer by an electroless plating method. As a formation method, a generally known electroless plating method was used. According to the method, the oxide film formed on a surface of aluminum was removed, a zincate treatment was performed, then nickel was formed. The nickel is formed by substituting zinc (Zn) stuck to a surface of aluminum and by growing according to a reduction reaction. As a treatment liquid, a drug solution manufactured by Uemura Kogyo K. K. was used. As a pretreatment liquid, cleaner EPITHAS MCL-16 was used to etch the oxide layer on the uppermost surface of aluminum. After that, zincate treatment was performed. As a zincate treatment liquid, EPITHAS MCT-17 was used. On an aluminum pad subjected to the zincate treatment, zinc was precipitated, and, thereon electroless nickel was plated with EPITHAS NPR-18. At this time, a deposition rate of nickel is 0.2 μm/min and nickel was precipitated to a height of 10 μm similar to that of a nozzle; accordingly, a time period of electroless nickel plating was 50 min. Since the plating is performed by controlling a time, a height substantially the same as the solid member 6 can be obtained. When the mold 7 is higher than the solid member 6, chemical mechanical polishing (CMP) may be used. As illustrated in the drawing, the flow path wall is vertical; accordingly, also the mold formed by an electroless plating method is formed vertical.

Next, as illustrated in FIG. 14G, the covering photosensitive dry film 8 that is a kind of material similar to the flow path sidewall was provided. The material is a negative photosensitive dry film and contains 100 parts of EHPE3150 (trade name, manufactured by Daicel Chemical Industries, Ltd.) by weight that is an epoxy dry film, and 6 parts of a photocationic polymerization catalyst SP-172 by weight (trade name, manufactured by Asahi Denka Kogyo K. K.). After that, exposure was conducted by use of an exposure unit such as a stepper to form the ink discharge port 9. Since the covering photosensitive dry film is a negative type, exposure was conducted so that light does not impinge on the discharge port. After that, development was performed to form the ink discharge port 9. Then, as illustrated in FIG. 14H, the aluminum material that is the seed layer 5 formed inside of the ink flow path and nickel formed by an electroless plating method were etched with ferric chloride and removed. Simultaneously therewith, debris 40 attached onto the aluminum material that is the seed layer 5 was lifted off.

The substrate 1 on which a nozzle portion was formed according to the process mentioned above was cut by a dicing saw and separated into chips. Then, the substrate 1 was electrically connected to drive the energy generating elements 3. After that, a chip tank member for ink supply was connected to complete the ink-jet head.

It was confirmed that in the discharge port member 8 of the ink-jet head obtained according to the present example, there is no residue considered to be a layer compatible with the mold.

With reference to FIGS. 16A to 16H, Example 10 of the present invention will be described.

Figure 16A:
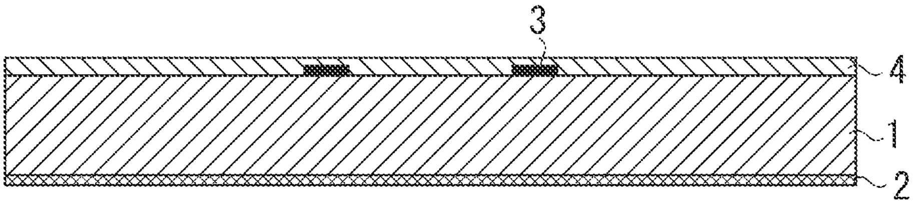
FIGS. 16A, 16B, 16C, 16D, 16E, 16F, 16G, and 16H are schematic sectional views for describing a method of manufacturing an ink-jet head according to Example 10 of the present invention.
Figure 16B:
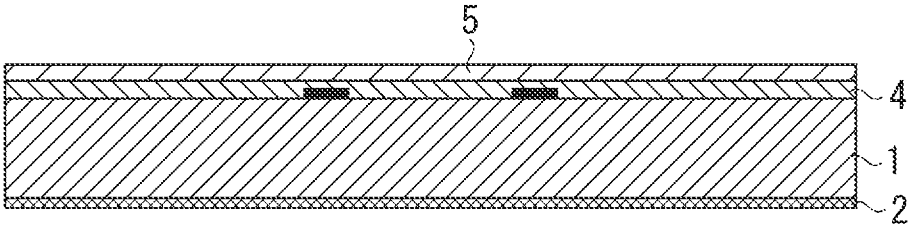

As illustrated in FIG. 16A, in a manner similar to Example 1, the substrate 1 was prepared. Then, as illustrated in FIG. 16B, the seed layer 5 was deposited on the substrate 1 by a sputtering method. As a material of the seed layer, gold was used. A thickness thereof was set to 0.3 μm.

Figure 16C:
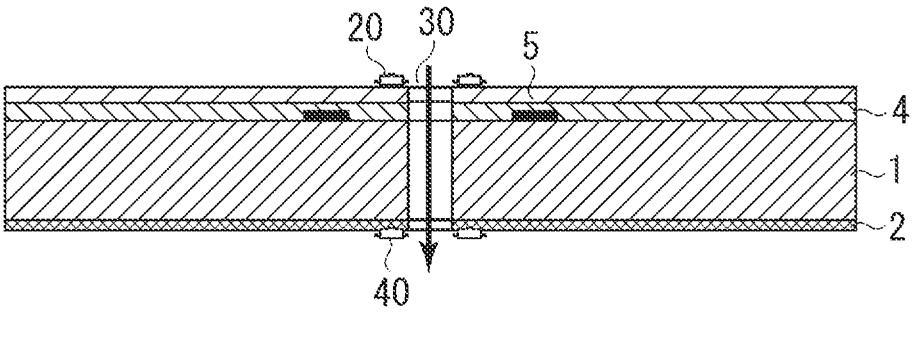

Next, as illustrated in FIG. 16C, a laser was used to perform a process from the substrate surface on which energy generating elements 3 were formed into the region that becomes the ink supply port. The process depth and pattern were the same as Example 1.

Figure 16D:
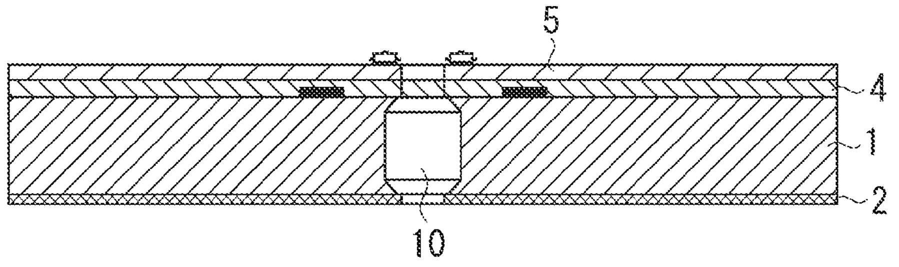
Figure 16E:
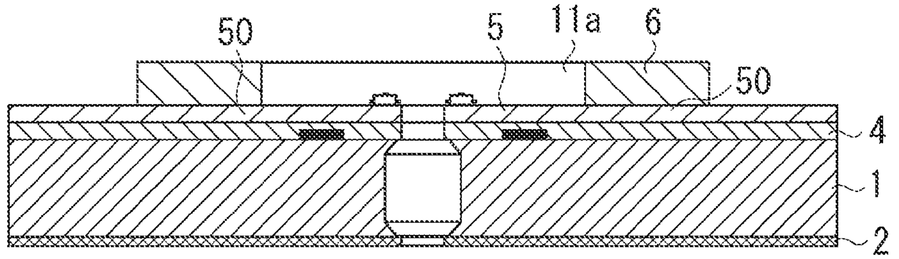

Then, as illustrated in FIG. 16D, the ink supply port 10 was formed by anisotropic etching method. The anisotropic etching was conducted in a manner similar to Example 9. Next, as illustrated in FIG. 16E, the solid member 6 that becomes the flow path wall was formed. A material for forming a solid member 6 was the same as Example 9.

Figure 16F:
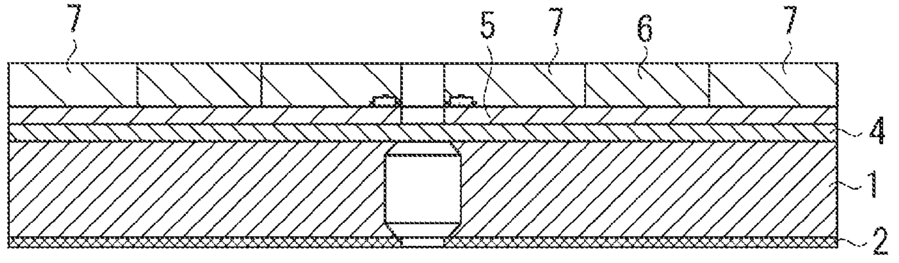

Next, as illustrated in FIG. 16F, on the seed layer 5, a gold plating layer as the mold 7 was formed. As a forming method, a generally known electroplating method was used. As a plating liquid, MICROFAB Au100 (trade name, manufactured by ELECTROPLATING ENG OF JAPAN CO.) mainly made of gold sulfite was used. At this time, a deposition rate of gold is 0.3 μm/min and gold is deposited up to a height of 14 μm similar to that of the flow path; accordingly, it took 46 min as a time period of electroplating of gold.

Figure 16G:
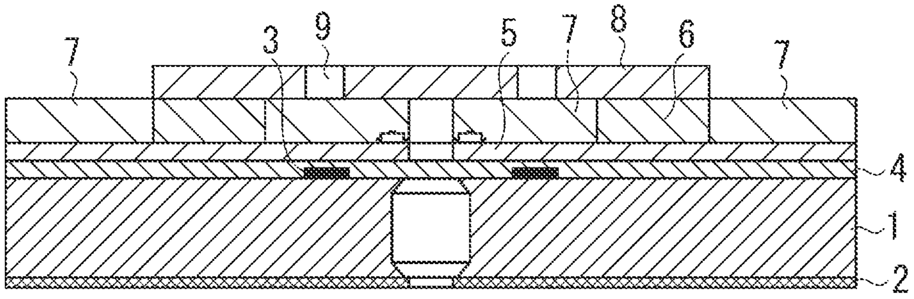
Figure 16H:
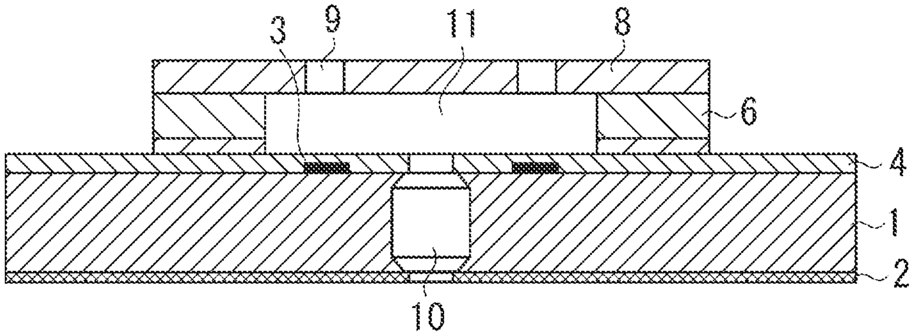

Then, as illustrated in FIG. 16G, in a manner similar to Example 9, the ink discharge port 9 was formed. Next, as illustrated in FIG. 16F, in a manner similar to Example 9, the ink supply port 10 was formed. After that, gold of the seed layer formed inside of the ink flow path and the mold formed by an electroplating method were removed with an iodine/potassium iodide solution. In the present example, AURUM 302 (trade name, manufactured by Kanto Kagaku) was used. Processes after that were conducted in a manner similar to Example 9.

It was confirmed that in the discharge port member 8 of the ink-jet head obtained according to the present example, there is no residue considered to be a layer compatible with the mold.

According to the present invention, since a region that becomes a flow path is filled with a mold made of metal, the mold that fills a region that becomes a flow path and a covering layer that becomes a discharge port member are inhibited from mixing with each other; accordingly, when the mold is removed, the mold hardly remains inside of the flow path. As the result thereof, the flow path is formed into a desired shape with excellent precision and the liquid discharge heads having excellent discharge characteristics can be obtained with high yield.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-195708 filed Sep. 1, 2010 and No. 2010-285146 filed Dec. 21, 2010, and No. 2010-293023 filed Dec. 28, 2010 which are hereby incorporated by reference herein in their entirety.

What is claimed is:

1. A method of manufacturing an inkjet liquid discharge head having a flow path of a liquid, which communicates with a discharge port of the liquid, comprising:

providing a substrate on which a solid member is disposed to surround a region that becomes the flow path, and a metal layer made of a metal or a metal compound is disposed inside of the region;

forming a mold of the flow path made of a metal or a metal compound inside of the region by plating the mold with the metal layer;

disposing a cover layer made of a resin to cover the solid member and the mold in contact with the solid member and the mold, wherein the solid member and the metal are formed with a distance therebetween; and removing the mold to form the flow path.

2. The method of manufacturing an inkjet liquid discharge head according to claim 1, wherein between the solid member and the substrate, the metal layer is provided in contact with the solid member and the substrate.

3. The method of manufacturing a liquid discharge head according to claim 1, wherein the plating is electroplating that forms the plating layer while energizing the metal layer.

4. The method of manufacturing a liquid discharge head according to claim 1, wherein the plating is electroless plating that forms the plating layer without energizing the metal layer.

5. The method of manufacturing a liquid discharge head according to claim 4, wherein the providing of a substrate comprises:

providing a substrate on which a metal material layer made of a metal or a compound thereof and used for forming the metal layer is disposed;

forming the metal layer inside of the region, and an external metal layer distanced from the metal layer outside of the region, respectively, from the metal material layer; and providing the solid member to cover a top surface and a side surface of the external metal layer.

6. The method of manufacturing a liquid discharge head according to claim 3, wherein the metal layer is made of any one selected from gold, copper, and alloys including these.

7. The method of manufacturing a liquid discharge head according to claim 6, wherein the plating layer is made of any one selected from gold, copper, nickel, and alloys including these.

8. The method of manufacturing a liquid discharge head according to claim 4, wherein the metal layer is made of aluminum, and the plating layer is made of nickel.

9. The method of manufacturing a liquid discharge head according to claim 1, further comprising:

disposing the metal layer obtained by stacking a first metal layer and a second metal layer in this order continuously over the inside of the region and between the solid member and the substrate;

after a plating layer is removed, removing the second metal layer inside the region by selectively dissolving the second metal layer relative to the first metal layer; and removing the first metal layer inside of the region by dissolving selectively relative to the second metal layer.

10. The method of manufacturing a liquid discharge head according to claim 9, wherein the first metal layer is made of gold, and the second metal is made of copper.

11. The method of manufacturing a liquid discharge head according to claim 1, wherein an energy generating element that generates energy utilized for discharging a liquid is disposed inside of the region of the substrate, and the discharge port is formed at a position that faces the energy generating element of the covering layer.

12. The method of manufacturing a liquid discharge head according to claim 1, further comprising:

providing a substrate on which a solid member is disposed to surround the region that becomes the flow path and a region distanced from the region to be the flow path, respectively;

forming a mold of the flow path made of a metal or a metal compound in a region that becomes the flow path, and a stress relaxation member made of a metal or a metal compound in a region distanced from the region that becomes the flow path, respectively;

disposing a cover layer made of a resin to cover the solid member, the mold and the stress relaxation member in contact with the solid member, the mold and the stress relaxation member; and removing the mold to form the flow path.

13. The method of manufacturing a liquid discharge head according to claim 1, further comprising:

providing a substrate that has a metal layer made of a metal or a metal compound;

conducting laser processing from a surface of the substrate;

anisotropically etching the substrate processed by laser with the metal layer remaining, to form a supply port;

providing a solid member to surround a region that becomes the flow path;

forming a mold of the flow path made of a metal or a metal compound in the region;

disposing a covering layer made of a dry film to cover the solid member and the mold, in contact with the solid member and the mold; and removing the mold and metal layer.

* * * * *